(12) United States Patent
Beyhs et al.

(10) Patent No.: US 10,698,489 B1
(45) Date of Patent: Jun. 30, 2020

(54) COMPACT PIVOTING INPUT DEVICE

(71) Applicant: Apple Inc., Cupertino, CA (US)

(72) Inventors: Michael J. Beyhs, San Francisco, CA (US); Mark A. Salada, Sunnyvale, CA (US); Megan A. McClain, San Francisco, CA (US); Brenton A. Baugh, Los Altos Hills, CA (US); Brian T. Gleeson, Mountain View, CA (US); Thayne M. Miller, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/024,680

(22) Filed: Jun. 29, 2018

Related U.S. Application Data

(60) Provisional application No. 62/652,242, filed on Apr. 3, 2018.

(51) Int. Cl.
| | |
|---|---|
| *G06F 3/01* | (2006.01) |
| *G06F 3/0338* | (2013.01) |
| *G06F 3/02* | (2006.01) |
| *H04M 1/23* | (2006.01) |
| *H01H 9/04* | (2006.01) |
| *H01H 3/12* | (2006.01) |

(52) U.S. Cl.
CPC .......... *G06F 3/016* (2013.01); *G06F 3/0202* (2013.01); *G06F 3/0338* (2013.01); *H04M 1/236* (2013.01); *H01H 3/12* (2013.01); *H01H 9/04* (2013.01); *H01H 2215/05* (2013.01); *H01H 2221/01* (2013.01); *H01H 2221/022* (2013.01)

(58) Field of Classification Search
CPC ...... G06F 3/016; G06F 3/0202; G06F 3/0338; H04M 1/236
USPC .............. 345/174, 184; 343/702; 273/148 R; 340/497.2
See application file for complete search history.

(56) References Cited

U.S. PATENT DOCUMENTS

| | | | | |
|---|---|---|---|---|
| 3,236,995 A | * | 2/1966 | Fibikar | G01M 1/22 219/86.24 |
| 3,322,952 A | * | 5/1967 | Jewell | G06K 11/04 250/202 |
| 3,411,209 A | * | 11/1968 | Stemler | A61C 1/0015 433/98 |
| 3,512,176 A | * | 5/1970 | Vogt | G01D 15/14 346/107.4 |
| 5,392,662 A | * | 2/1995 | Jadrich | B23Q 5/408 267/160 |
| 5,739,757 A | * | 4/1998 | Gioutsos | B60K 28/04 177/144 |
| 5,838,138 A | * | 11/1998 | Henty | G06F 1/1616 320/107 |
| 6,307,285 B1 | * | 10/2001 | Delson | H02K 23/00 273/148 R |
| 6,468,158 B1 | | 10/2002 | Ootori et al. | |

(Continued)

*Primary Examiner* — Prabodh M Dharia
(74) *Attorney, Agent, or Firm* — Dorsey & Whitney LLP

(57) ABSTRACT

An input device includes an input structure, a magnet attached to the input structure, and an electromagnet. The magnet rotates when the electromagnet is activated, thereby rotating the input structure. The magnet and input structure rotate about a pivot in order to provide haptic and/or visual feedback to a user. The pivot may attach the magnet and input structure to a body, which in turn may be affixed to, or part of, an electronic device. The electromagnet can encircle the body and/or magnet.

20 Claims, 18 Drawing Sheets

(56) References Cited

U.S. PATENT DOCUMENTS

| | | | |
|---|---|---|---|
| 8,803,802 B2 | 8/2014 | Hatanaka et al. | |
| 9,058,946 B2* | 6/2015 | Villain | H01H 9/24 |
| 9,588,550 B2* | 3/2017 | Smith | G06F 1/1613 |
| 9,947,491 B1* | 4/2018 | Thome | H01H 13/14 |
| 10,426,561 B1* | 10/2019 | Kelly | A61B 34/30 |
| 2005/0275294 A1* | 12/2005 | Izumi | H02K 33/16 |
| | | | 310/15 |
| 2008/0018592 A1 | 1/2008 | Park | |
| 2008/0074329 A1* | 3/2008 | Caballero | H01Q 1/088 |
| | | | 343/702 |
| 2008/0105748 A1* | 5/2008 | Lei | G06K 7/10722 |
| | | | 235/462.42 |
| 2008/0297328 A1* | 12/2008 | Crawford | G08B 6/00 |
| | | | 340/407.2 |
| 2010/0079404 A1* | 4/2010 | Degner | G06F 3/03547 |
| | | | 345/174 |
| 2010/0283228 A1* | 11/2010 | Ehrenreich | B60B 33/0002 |
| | | | 280/647 |
| 2011/0140818 A1* | 6/2011 | Hatanaka | G05G 5/05 |
| | | | 335/219 |
| 2013/0342484 A1* | 12/2013 | Bae | G06F 3/016 |
| | | | 345/173 |
| 2015/0015741 A1* | 1/2015 | Kim | H04N 5/23216 |
| | | | 348/239 |
| 2016/0162031 A1* | 6/2016 | Westerman | G06F 3/016 |
| | | | 345/173 |
| 2017/0285781 A1* | 10/2017 | Degner | G06F 3/03547 |
| 2017/0336273 A1* | 11/2017 | Elangovan | A43B 17/18 |
| 2019/0339804 A1* | 11/2019 | Gleeson | G06F 3/016 |

* cited by examiner

US 10,698,489 B1

COMPACT PIVOTING INPUT DEVICE

CROSS-REFERENCE TO RELATED APPLICATION(S)

This application is a nonprovisional patent application of and claims the benefit of U.S. Provisional Patent Application No. 62/652,242, filed Apr. 3, 2018 and titled "Compact Pivoting Input Device," the disclosure of which is hereby incorporated herein by reference in its entirety.

FIELD

The described embodiments relate generally to input mechanisms for electronic device, and more particularly to input surfaces that pivot about a pivot point beneath the input surface, in response to an input provided on the input surface.

BACKGROUND

Many traditional electronics include buttons, switches, keys, or other types of components as input devices. It is desirable that input devices provide haptic feedback to a user.

Many traditional input devices are mechanical buttons. Mechanical buttons are generally reliable and provide inherent haptic feedback, as a user can often feel the mechanism of the button moving, for example between button positions. However, mechanical switches typically have set haptic outputs or feedback, dictated by their design. Also, as electronic devices have become more space-constrained, mechanical buttons have presented problems and design limitations. Many mechanical switches need a minimum amount of space to operate. For example, a typical dome switch needs about 200 microns of travel for the dome to collapse and close the switch. This is especially problematic in very thin electronic devices.

Pivoting input structures may allow increased haptic design flexibility and may allow the haptics to change with environmental or use conditions. A pivoting button may provide an adjustable haptic feedback to the user. Also, pivoting input structures may greatly reduce required space and particularly travel. Many pivoting buttons travel 10 microns or less when force is exerted thereon. Pivoting buttons can use force sensors to determine when the button is pressed, for example. The force sensor registers a change in capacitance, resistance, current, voltage, or other electrical value when the pivoting button moves or flexes, even though such motion may be very small.

Many pivoting input structures, such as buttons, require physical movement of some portion of the input structure to register an input and/or to trigger haptic feedback of a user input. Although the physical movement of pivoting systems is reduced to that of mechanical systems, a pivoting system that does not require physical movement may combine several advantages of traditional mechanical switches and pivoting input structures. For example, a pivoting system devoid of vertical or inward movement may provide the increased reliability of mechanical buttons with the lower profile and variable haptics of a pivoting system.

SUMMARY

One embodiment described herein takes the form of an input device for use with an electronic device comprising: a button; a force sensor configured to sense an input on the button; a permanent magnet attached to the button; a body; a pivot coupling the body to the button; and an electromagnet adjacent the permanent magnet; wherein the electromagnet is configured to generate a magnetic field in response to the force sensor sensing the input, thereby rotating the permanent magnet and the button about the pivot to provide haptic feedback.

Another embodiment described herein takes the form of an electronic device, comprising: an enclosure defining an opening; a body attached to the enclosure; a button extending through the opening and defining an input surface, the body pivotally attached to the button; a sensor configured to detect an input on the input surface; a permanent magnet attached to the button and positioned within the enclosure; and an electromagnet attached to the body, positioned within the enclosure, and encircling the permanent magnet; wherein the button is configured to provide haptic feedback.

Still another embodiment takes the form of an input device, comprising: an input structure defining an input surface; a sensor configured to detect a force on the input surface; a pivot below the input surface and about which the input structure rotates; and an actuator configured to rotate the input structure about the pivot; wherein: rotation of the input structure moves the input surface substantially transverse to a direction of the force.

BRIEF DESCRIPTION OF THE DRAWINGS

The disclosure will be readily understood by the following detailed description in conjunction with the accompanying drawings, wherein like reference numerals designate like structural elements, and in which.

Figure 1:
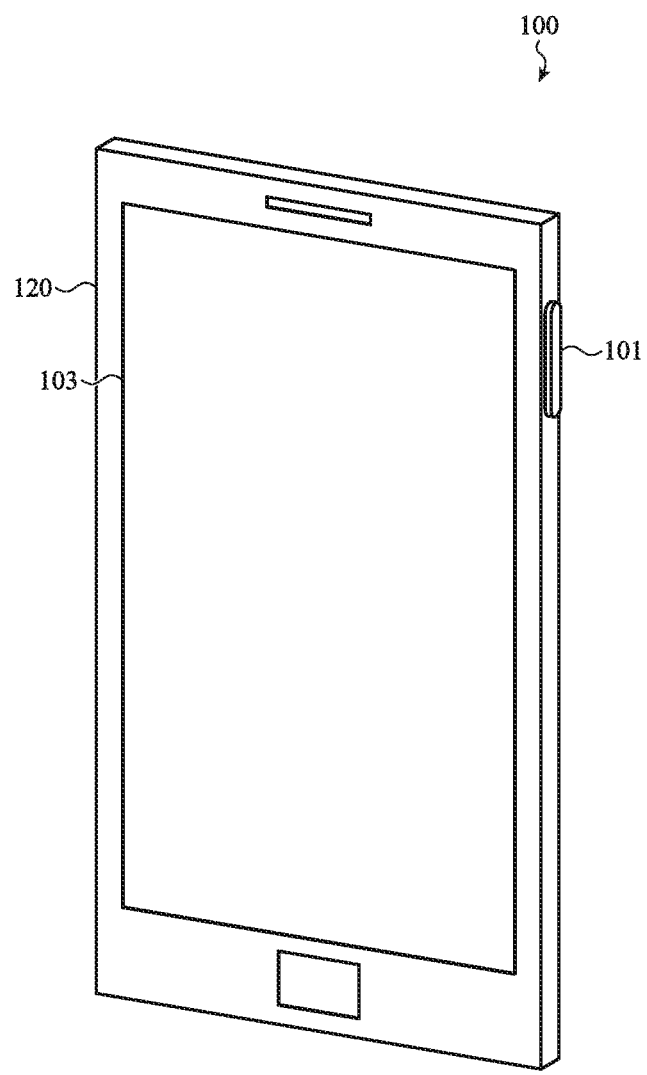
FIG. 1 illustrates one example of an electronic device with a pivoting input device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the disclosure to any preferred or particular embodiments. To the contrary, it is intended to cover alternatives, modifications, and equivalents as can be included within the spirit and scope of the described embodiments as defined by the appended claims.

As used herein, the term "input device" refers generally to a set of elements to cooperate to provide a signal to an electronic device in response to an input. The term "input structure" refers generally to a specific element that accepts a touch, force, or the like as an input. The term "input surface" refers to the portion of the input structure with which a user interacts to provide or initiate an input. An "input" is any interaction with an input surface (and thus an associated input structure and input device) provided by a user that results in the generation of a signal to the electronic device. Thus, touch, force, motion, gaze, and the like are all different types of inputs that may operate with different input surfaces, structures, and/or devices.

Embodiments described herein relate generally to an input device that pivots about a pivot point in response to an input force. The pivot point is generally located beneath the input surface of the input device. Further, the pivot point is generally in line (or nearly in line) with a direction in which an input is exerted or otherwise provided. The input device (or at least the input structure) generally pivots about the pivot point in response to the input. Insofar as the input device or structure rotates about the pivot point, its motion may be decomposed into two vectors along two axes. A "major" or "primary" vector of a force is the largest vector of a decomposed force. Generally, the major vector of the input device's rotation is transverse to the direction in which the input is provided rather than parallel. As used herein, "transverse" means perpendicular to, or at a substantially right angle to, the input force. Thus, the input device (or input structure) does not primarily move in the direction of the input but instead primarily perpendicular to it, or along it. Put another way, the major vector of a haptic output force is tangential to a surface exerting the input force.

In many embodiments, the input device may move in order to provide haptic output. The input itself may not perceptibly displace the input device, but instead an actuator may move the input device, or the input structure or input surface, in response to the input. Any displacement caused by the force of an input may be negligible or imperceptible to a typical person. Such negligible or imperceptible displacement may be less than 50 microns in some embodiments, less than 25 microns in some embodiments, less than 10 microns in some embodiments, or even less than five microns in some embodiments. Put another way, primary and/or perceptible motion of an input device (or input structure, or input surface) results not directly from an input exerted thereon but instead from an actuator's operation. The actuator may move the input structure (or, in some cases, the input device) when an input is sensed. As mentioned above, this motion may be primarily transverse to a direction in which an input is exerted or otherwise provided.

In sum, certain embodiments described herein may: sense an input force on an input surface of an input structure; rotate the input structure about a pivot, thereby moving the input surface transverse to the input force; and initiate an input to an associated electronic device. Generally, motion of the input surface is also tangential to a user's finger, or to whatever object is exerting the input force. It should be appreciated that rotating the input structure and initiating the input generally happen in response to sensing the input force.

Any of a variety of actuators may be used to pivot an input structure, and in many embodiments the actuator is part of the input device. In others, the actuator may be separate from the input device.

Thus, not only is the motion of input structures/devices discussed herein different from typical hinged structures that collapse or move primarily in a direction of an exerted force, but a person interacting with input devices described herein experiences an entirely different sensation. Embodiments described herein effectively create a haptic sensation through skin shear (e.g., lateral or tangential movement of skin induced by the input surface) rather than having the input surface press into or compress skin. Embodiments described herein may harness this tangential motion of the input device relative to a user's skin to provide unique, highly controllable, complex haptic outputs to a person. Further, the energy required to pivot an input structure may be less than the energy required to translate it.

One sample embodiment described herein is an electromagnetic pivoting input device for use in an electronic device. An electromagnetic pivoting input device may be actuated in response to a relatively small movement as compared to a traditional mechanical input device (such as a button with a dome switch). Additionally, electromagnetic pivoting input devices may move laterally with respect to an enclosure or other surface through which the input device protrudes, thereby reducing internal volume necessary to operate the input device. Further, such a device may provide variable or controllable haptic feedback to a user of the input device.

A sample input device may include a button or other input structure defining an input surface. The button (or other input structure) and an associated permanent magnet are affixed to, and pivot on or around, a structural body. An adjacent electromagnet generates a magnetic field that displaces the permanent magnet, in turn pivoting the button between a neutral, unactuated first button position and an actuated, second button position. As the button actuates, the input surface may pivot with the button. A user touching the input surface will feel the pivoting or actuation of the button and thus receive haptic feedback that the button has actuated. Furthermore, the user may be able to see the pivoting of the button between the neutral unactuated first position and the actuated second position. It should be appreciated that the distance the button pivots may be small enough that its rotational/pivoting motion is indistinguishable to a user from a lateral motion (e.g., translation into or out of an enclosure of an electronic device).

A permanent magnet is a material or an object made from a material that creates a persistent magnetic field. A permanent magnet has a pair of opposing magnetic poles, termed a north and a south magnetic pole. Magnetic field lines run between the two opposing magnetic poles. A permanent magnet will attract metallic materials, and may also attract or repel another magnet, depending on the polarity of the magnets. A permanent magnet is influenced by a magnetic field, meaning a permanent magnet may be displaced by an external magnetic field.

An electromagnet is a device which generates a magnetic field by way of an electric current. Ampere's law provides that an electric current flowing in a wire generates a magnetic field. Such a magnetic field dissipates and eventually stops when the electric current stops flowing. A typical electromagnet is formed from a wire coil. It creates a magnetic field that encircles the coil and is strongest within the coil. The configuration of the electromagnet determines the character of the generated magnetic field. For example, the materials of the electromagnet, the geometry of the electromagnet such as the number of turns in the coil windings, and the current running in the coiled wire, will influence the generated magnetic field.

In one embodiment, a permanent magnet is attached below a button and positioned to fit within an interior of an electromagnet (such as in a space defined by windings of a coil). The permanent magnet and button are on opposing sides of a pivot.

The windings define a height of the electromagnet and an interior volume within the electromagnet. When the electromagnet is not operating, meaning no electric current is flowing through the wire windings and thus no magnetic field is generated, the permanent magnet is in a neutral position approximately in the middle of the interior volume. The button likewise is in a neutral position such that the input surface is horizontal (or substantially horizontal) with respect to a major axis of the input device. However, when the electromagnet is turned on, a resulting magnetic field moves the permanent magnet within the interior volume. More specifically, the permanent magnet rotates about the pivot such that it moves closer to one side of the interior of the interior volume of the wire windings of the electromagnet. The magnet's motion causes the button to rotate about the pivot as well, moving in an opposite direction to the motion of the permanent magnet. Put another way, while the magnet and button both rotate in the same direction, their directions of motion are opposite one another. Thus, the button's input surface tilts relative to the major axis (and typically, though not necessarily, relative to an enclosure of an electronic device incorporating the input device).

The button may be positioned in, or protrude from, an opening defined in an exterior surface of an electronic device, such that the input surface is accessible by a user. The button may be conformal with the exterior surface, or may project from the exterior surface of the electronic device. In one embodiment, the input surface is substantially aligned or parallel with an adjacent exterior surface of the electronic device when the button is in the neutral position. The button input surface may be tilted with respect to the adjacent exterior surface when the button is in the actuated position.

In one embodiment, the input is oblong-shaped and is positioned along an exterior edge of an electronic device, such as a mobile phone. The input device may be or include a key, switch, toggle, or the like instead of a button.

The button may actuate in any of several ways. For example, the input device may have a major axis, a minor axis, and a pivot axis such that the button rotates about a pivot axis and within a plane defined by the major axis and the minor axis. In some embodiments, the button may slide or translate along one or both of the major and minor axes. Alternatively or additionally, the major or minor axes may also be the pivot axis. In many embodiments, the pivot axis is parallel to the input surface.

In some embodiments and as described in more detail herein, the pivot axis may be adjustable. By adjusting the pivot axis of the input structure, the distance the input surface moves may be changed. As the pivot axis moves further away from the input surface, the travel distance of the input surface increases. Increased travel distance yields greater (and more easily sensed) haptic output, and likewise increases a velocity of the input surface. Some embodiments may permit a user to choose a distance of the pivot point from the input surface in order to customize a feel and/or magnitude of haptic output by adjusting the travel distance and/or velocity of the input surface.

In one embodiment, although the button may actuate, the actuation is not required to register a button input for the electronic device. Stated another way, the physical movement or actuation of the button is not required to initiate or terminate an input. Instead, the button actuation may be effected, for example, to provide a type of haptic feedback to the user.

Various configurations of a permanent magnet and an electromagnet are disclosed. By varying the relative positions of the permanent magnet and the electromagnet, and/or by varying the configuration of the electromagnet, the strength and/or location of the magnetic field relative to the permanent magnet varies, which in turn adjusts the input device's actuation kinematics. For example, a permanent magnet positioned closer to a relatively higher strength magnetic field area, as generated by the electromagnet, will be relatively more responsive to the magnetic field, and thus the attached button will be relatively more responsive to the electromagnet. Generally, a more responsive button reacts faster and with fewer time lags to an actuation input.

In another embodiment, a permanent magnet is coupled to a button positioned to fit at least partially within or above an electromagnet. The button is configured to rotate, pivot, slide or otherwise move on or about a structural body placed within an electronic device. The permanent magnet, when in its neutral position, extends approximately to the middle of the interior volume of the electromagnet (e.g., an end of the permanent magnet is positioned within the interior volume). The electromagnet produces a magnetic field extending upward and across or through the permanent magnet, resulting in a force that moves the permanent magnet. More specifically, the permanent magnet moves relative to an upper surface of the electromagnet and closer to one edge of the interior volume of the electromagnet wire windings. This second permanent magnet position corresponds to an actuated second button position.

In another embodiment of an input device described herein, a permanent magnet is coupled to a button and rests at least partially within an electromagnet. The button is attached to the permanent magnet. The button, in concert with the permanent magnet, is configured to pivot on a structural body. The permanent magnet typically has an axis that is parallel with a pivot axis of the input device. The permanent magnet rotates about the pivot axis in response to the electromagnet generating a magnetic field, in turn rotating or pivoting the button about the structural body.

In another embodiment, a permanent magnet attached below a button is positioned to fit within an electromagnet, the electromagnet formed by a set of wire windings. The button is attached to the permanent magnet. The button and permanent magnet are configured to pivot on a structural body placed within an electronic device. The permanent magnet is positioned such that one end rests within an interior volume of the electromagnet. The permanent magnet is positioned in a neutral position within the interior volume of the electromagnet, with the lateral sides of the permanent magnet aligned with interior sides of the encircled electromagnet. The configuration of the electromagnet produces, when a current is flowing through the windings of the electromagnet, a magnetic field extending vertically along the sides of the permanent magnet. The generated magnetic field imparts a torque force to the permanent magnet. The permanent magnet rotates about the pivot axis upon receipt of a magnetic field, as generated by the electromagnet. The rotation of the permanent magnet results in rotation of the button.

In some embodiments, the button may also include a force sensor. The force sensor may be coupled the electromagnet or permanent magnet, or may be affixed to another part of the input device and/or associated electronic device. The force sensor may be a Hall Effect sensor, strain sensor, capacitive sensor, resistive sensor, pyroelectric sensor, or optical sensor.

Electronic circuits, processors, and/or electro-mechanical systems may control or adjust the magnetic field generated by the electromagnet, which in turn controls or adjusts the actuation of the input device. For example, the amount of current passing through the electromagnet will determine the magnitude of the generated magnetic field, which in turn will determine the kinematics of the button actuation. A processor may also communicate with one or more sensors coupled to the input surface, such as input force sensors, touch sensors, and proximity sensors.

Generally, an "input surface" is any surface configured to receive an input, such as a force or touch. An input surface may be a surface of an "input structure," which is an element configured to accept an input, such as a touch or force, from a user or object. An input structure may be one element of an "input device," which is any device configured to receive an input and facilitate generating an output in response. Sample input devices may incorporate input structures such as a button, a switch, a key, a trackpad plate, a mouse, and so on. In some embodiments, an edge, side, or other external portion of an electronic device housing may be a single input device, or may be formed from multiple input devices.

These and other embodiments are discussed below with reference to FIGS. 1-12. However, those skilled in the art will readily appreciate that the detailed description given herein with respect to these Figures is for explanatory purposes only and should not be construed as limiting.

FIG. 1 illustrates a sample electronic device that may incorporate a pivoting input device, as described herein. Although a mobile phone is shown in FIG. 1, other embodiments may take forms of other electronic devices. Other types of computing or electronic devices can include a laptop computer, desktop computer, tablet computing device, wearable computing or display device (such as a watch, glasses, jewelry, clothing or the like), a digital camera, a printer, a scanner, a video recorder, a copier, a touch screen, and so on.

FIG. 1 illustrates an example of an electronic device 100, here configured as a mobile phone. The electronic device 100 is depicted as a mobile phone with pivoting input device 101, an enclosure 120, and a display 103. A button of the input device 101 extends through a sidewall of the electronic device. The electronic device 100 may include a variety of internal components configured to work with the pivoting input device 101.

The display 103 can be implemented with any suitable technology, taking the form of an LCD display, LED display, CCFL display, OLED display, and so on. The display 103 provides a graphical output, for example associated with an operating system, user interface, and/or applications of the electronic device 100. Functions of the electronic device 100, including the display of information, graphics, and the like on the display 103, may be modified in response to an input provided via the pivoting input device 101. As some non-limiting example, providing input through the pivoting input device 101, may wake or sleep the display, may scroll a list of icons (or other information) on the display, may change a state or parameter of the electronic device 100, may cause a graphic, icon, or other information shown on the display 103 to be modified in some fashion (such as becoming bigger, smaller, appearing, disappearing, and so on), or the like.

Figure 12:
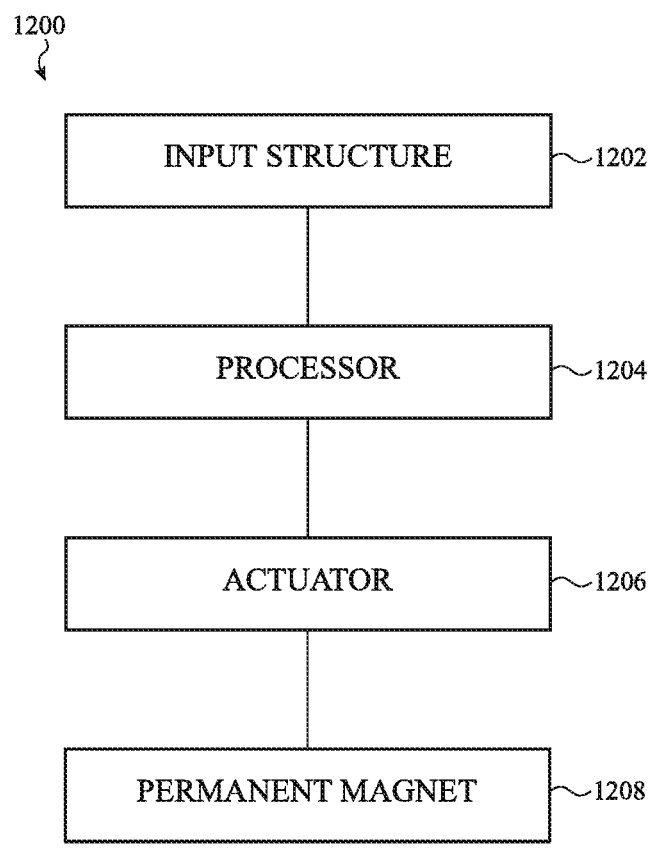
FIG. 12 is a sample block diagram of a pivoting input device and associated electronic components.

In various embodiments, a graphical output of the display 103 is responsive to inputs provided in response to the pivoting input device 101. The enclosure 120 provides a device structure and houses device components, such as a processor. In various embodiments, the enclosure 120 may be constructed from similar materials to the enclosure 120 of FIG. 1. FIG. 12, discussed below, provides additional details of a sample electronic device.

Figure 2:
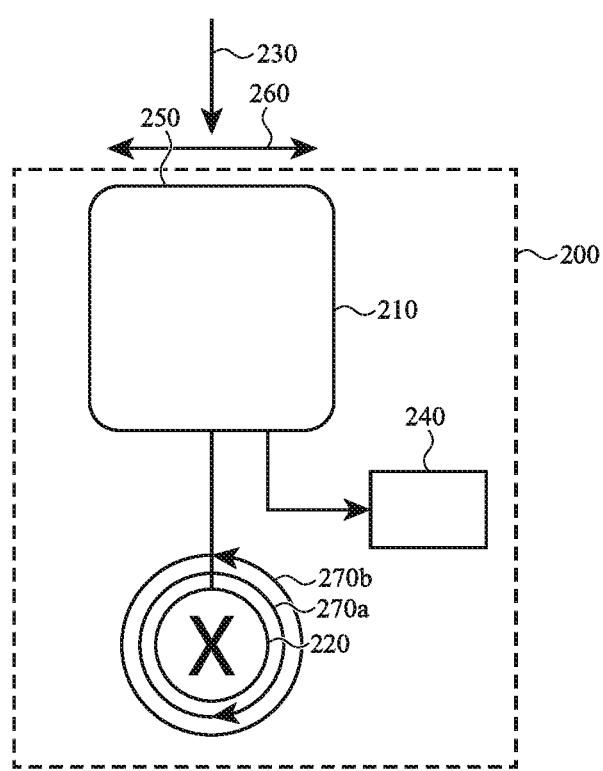
FIG. 2 illustrates a sample input device that pivots in response to an input force, rather than translating.

FIG. 2 shows a sample schematic of a pivoting input device 200. The input device 200 includes an input structure 210 and pivot 220. An input force 230 may be exerted on an input surface 250 of the input structure 210. A force sensor 240 may detect the input force 230.

The input structure 210 may rotate about the pivot 220 either clockwise or counterclockwise, as shown by the directional arrows 270*a*, 270*b*. As the input structure 210 rotates, the input surface 250 moves substantially transverse (e.g., perpendicularly) to the direction in which the input force 230 is exerted. Although the input surface 250 rotates about the pivot point, a major vector 260 of its motion is transverse to the input force 230 as shown. This transverse motion may induce skin shear in a finger or other body part of a user touching the input surface 250, which may register to the user as a haptic input.

Figure 3A:
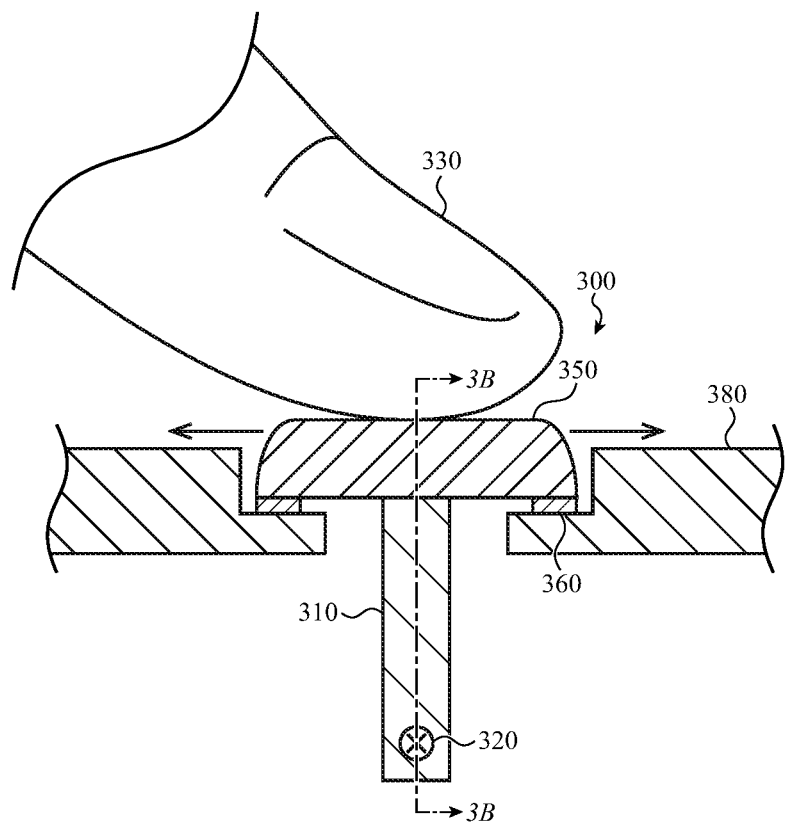
FIG. 3A is a cross-sectional view of a sample pivoting input device, implemented as a button.

FIG. 3A is a cross-sectional view of an input device 300 similar to that shown in FIG. 2, here implemented as a button for an electronic device. The button 300 may be at least partially contained within, and protrude from, a housing 380 of the electronic device. As shown, in response to an input force the input surface 350 moves primarily tangentially or laterally to the surface of the finger 390 touching the surface, which is also substantially transverse to the input force. The input surface 350 is the top of a button (e.g., input structure) 310. The button rotates about the pivot 320; this rotational motion induces the aforementioned transverse motion of the input surface 350 as illustrated by the directional arrows. A gasket 360 may provide a seal between the input structure 310 and the housing 380 against dust, water, and debris.

Figure 3B:
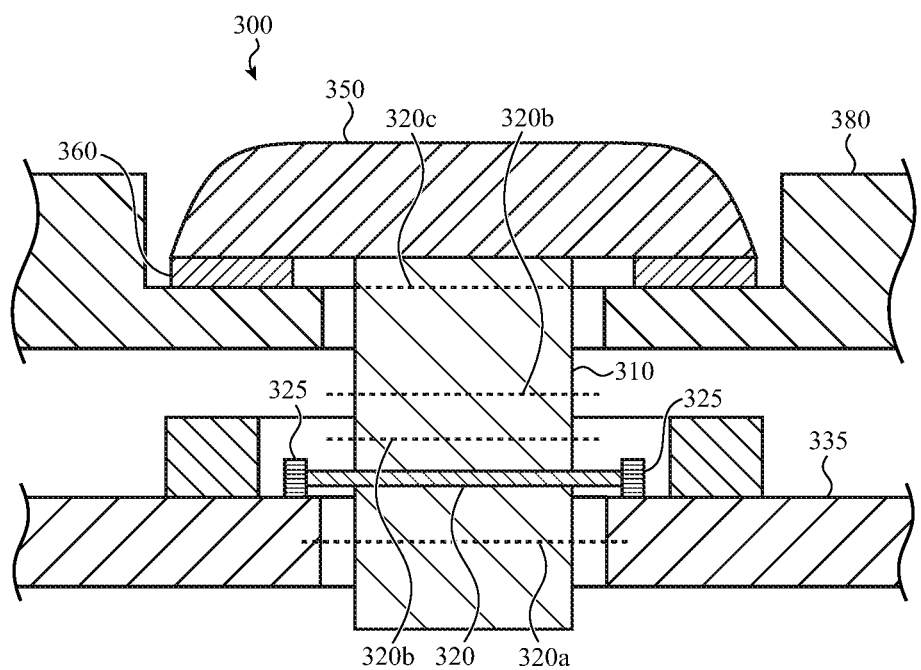
FIG. 3B is a second cross-sectional view of the sample pivoting input device of FIG. 3A, taken along line 3B-3B of FIG. 3A.

FIG. 3B is a second cross-sectional view of the input device 300 shown in FIG. 3A, taken along line 3B-3B in FIG. 3A. The cross-sectional view of FIG. 3B is offset by 90 degrees from the cross-sectional view of FIG. 3A. As shown in FIG. 3B, a cap or upper portion of the button 310 may rest on a gasket 360. The gasket may not provide physical support to the button, although in some embodiments it may. Rather, the button is held in place by the pivot 320, which may be a pin running through a shaft of the button 310. The pivot 320 is secured to a mount 325. One mount 325 is located at either end of the pivot 320. The mount is, in turn, affixed to a shelf 335 or other internal structure within the housing 380. Thus, the input structure 310 is coupled to the shelf 335 though the pivot 320 and mount 325.

An actuator 325 may be physically, electrically, and/or magnetically coupled to the button 310 (e.g., input structure). In the embodiment shown in FIG. 3B, the actuator 325 is an electromagnet, although in other embodiments the actuator 325 may be a different mechanical, electrical, or magnetic element. The actuator 325 causes the button 310 to rotate about the shaft running through the pivot 320, in response to an input force. Operation of sample actuators is discussed in more detail below.

FIG. 3B also illustrates a number of alternative pivots 320A, 320B, 320C. In some embodiments the location of the pivot 320 along the input structure 310 may be changed by a user or otherwise as a function of the electronic device (or of software or firmware of the electronic device). Generally, the closer the pivot 320 is to the input surface 350, the smaller the distance of travel of the input surface 350 is. The travel distance (also referred to as "displacement" or "translation") directly impacts the force imparted by the input surface 350 to a user's finger 390 as well as the velocity of the input surface. Accordingly, the closer the pivot 320 is to the input surface 350, the smaller and less perceptible the haptic output may be. Thus, the location of the pivot 320 along the shaft of the input structure 310 may be varied in order to adjust haptic output provided through the input surface 350. For example, if the input structure 310 rotates about pivot 320c. the travel distance of the input surface 350 is less than if the structure rotates about pivot 320b, which in turn yields less travel for the input surface 350 than if the input structure rotates about pivot 320a.

The pivot 320 also only limits motion of the input structure 310 to rotation, limiting or eliminating pure planar motion of the input surface 350. Further, the pivot 320 and mounts 325 cooperate to provide structural support for the input structure 310. Additionally, the pivot 320 and mounts 325 ensure that the force of the haptic output transmitted through the input surface 350 and to the user does not directly oppose the input force. Rather the haptic output force is primarily tangential (and, to some extent, in the same direction as) the input force. Because the input structure 310 does not actively work directly against the input force, the amount of energy required for the actuator to produce the haptic output may be reduced as compared to an actuator that pushed "upward" or against an input force. This may reduce overall power consumption of an electronic device incorporating an input device 300.

Figure 4A:
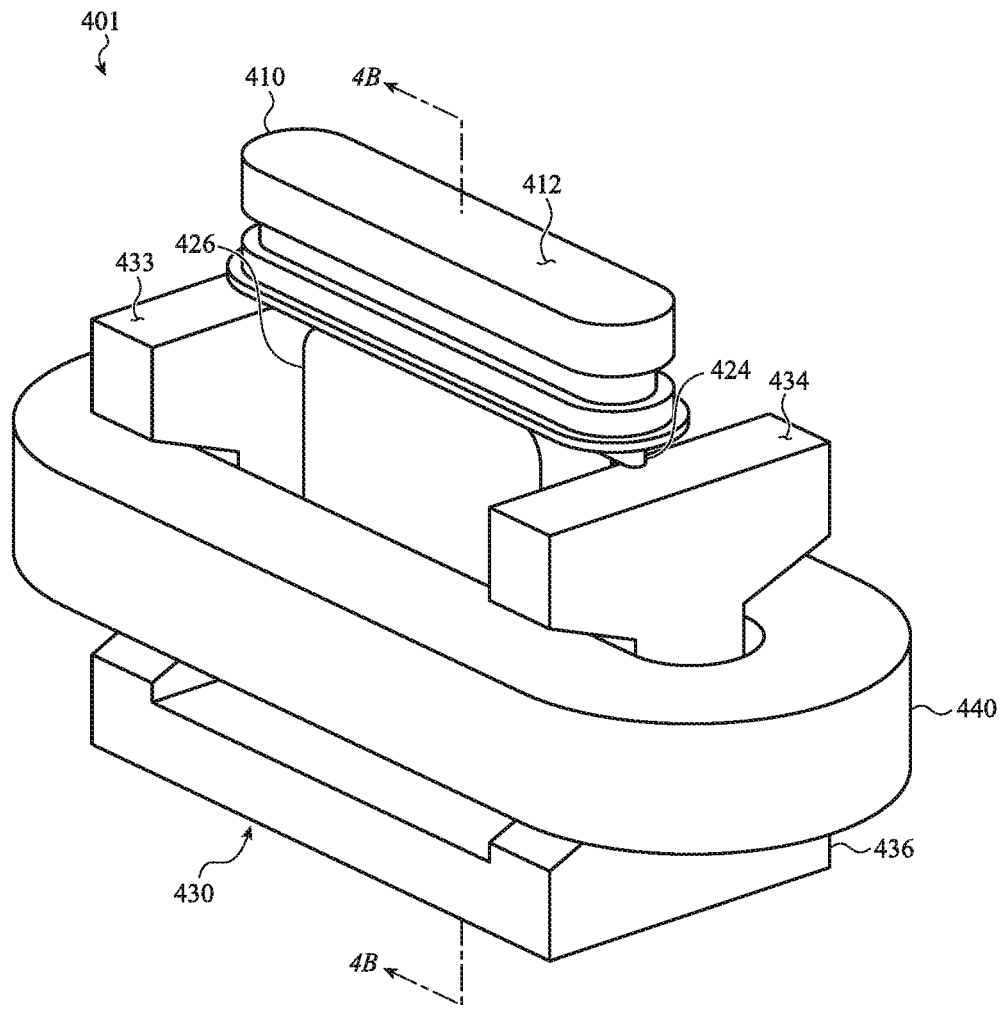
FIG. 4A is a sample view of one embodiment of a pivoting input device in an unactuated state.
Figure 4B:
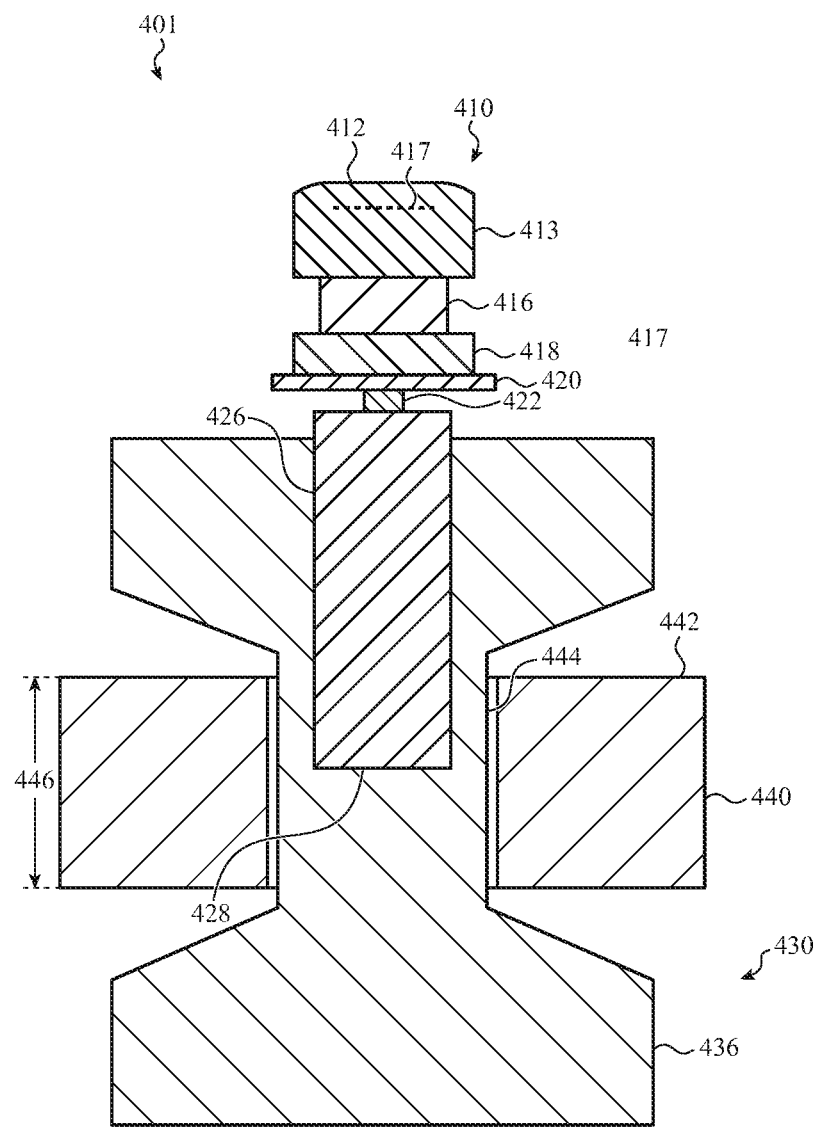
FIG. 4B is a cross-section view of the pivoting input device of FIG. 3A taken along line 4B-4B.
Figure 4C:
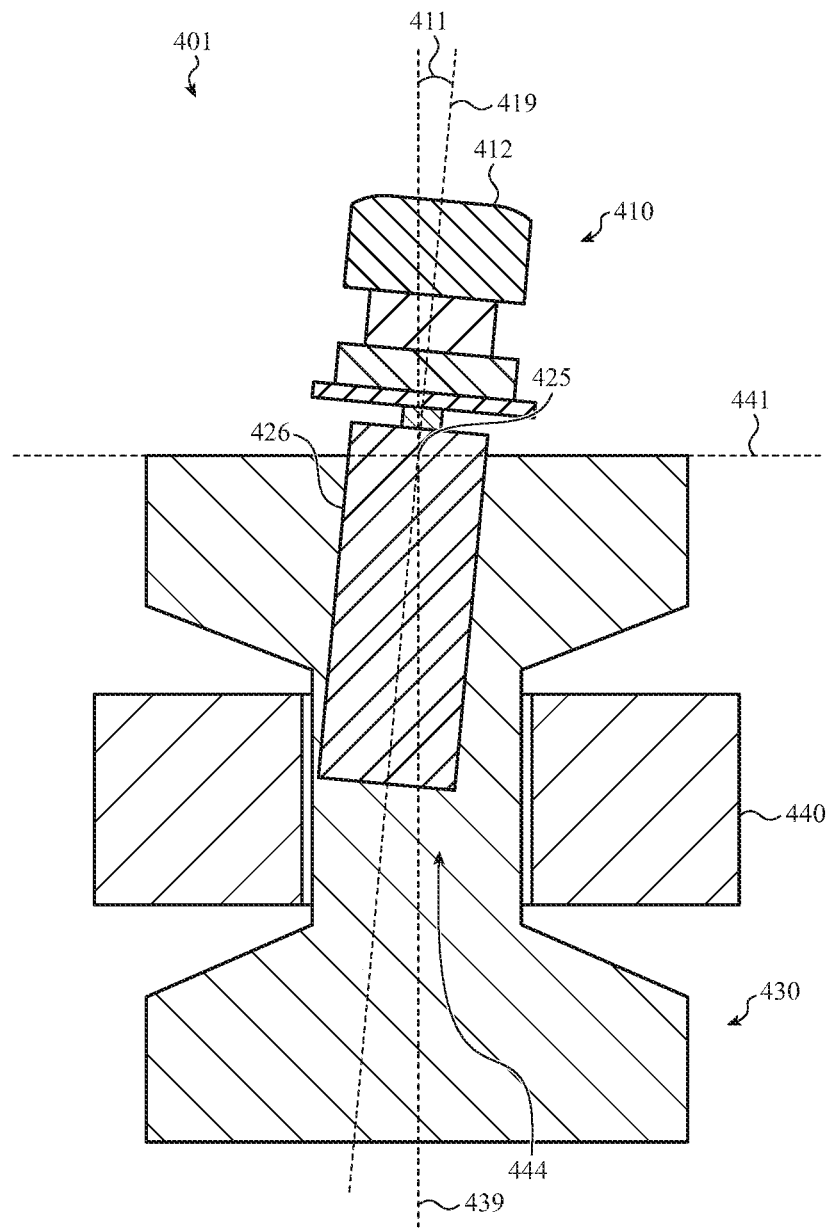
FIG. 4C is a cross-section view of the pivoting input device of FIG. 3A in an actuated state.

FIGS. 4A-4C illustrate one embodiment of a pivoting input device 401. The pivoting input device 401 is depicted with button 410 (e.g., an input structure) defining an input surface 412. A permanent magnet 426 is attached to a lower surface of the button 410. The permanent magnet 426 may be rigidly attached to the button 410, such that permanent magnet 426 moves or displaces in concert with the button 410.

The button 410 rotates relative to the body 430 about a pair of pivots 424 (or, in some embodiments, a single pivot). The pair of pivots 424 are attached to body 430 and positioned on each of first and second projections 433, 434, both of which are part of the upper body 432. Each of the two pivots 424 are positioned between a respective projection 433, 434 and a lower surface of the button 410. Thus, the pivots 424 are below the button 410 (or other input structure) and its input surface 412. More specifically, one pivot 424 is positioned between the first projection 433 and a first lower end of the button, and another pivot 424 is positioned between the second projection 434 and a second lower end of the button 410. One pivot 424 is disposed on the first projection 433 and another pivot 424 is disposed on the second projection 434. The pivot(s) 424 may rotate with respect to the body 430 or may be stationary while permitting the button 410 to rotate relative to the body 430.

The input surface 412 of the button/input structure 410 may be touched, pressed, or otherwise interacted with by a user. In some embodiments, the input surface 410 may translate, deflect, bend, or otherwise move a relatively small distance in response to user input and/or in response to a movement of the permanent magnet 426. In other embodiments, the input surface 412 does not translate, deflect, bend, or otherwise move in response to a user input. Input may be detected through a force sensor, touch sensor, or combination of the two. Such sensors are not shown for simplicity's sake.

The button 410 may include one or more steps or shelves. The one or more shelves may aid in fitting the button to a host electronic device, such as fitting the button 410 within an opening along an exterior of a host electronic device. The one or more shelves may receive a gasket, the gasket engaging one or more shelves. More description of the fitting of the button 410 to a host electronic device and/or to a gasket is found below with respect to FIGS. 5A-5C, 6, and 7.

With attention to FIGS. 4A-4B, the button 410, in order from an upper portion (e.g., a portion extending from or facing an exterior of a host electronic device) portion to a lower portion (e.g., a portion extending into an interior of a host electronic device), includes an input surface 412, first upper portion 413, collar 416, first shelf 418, and a second shelf 420. The collar 416 is narrower and/or thinner than the first upper portion 413 of the button 410. The collar 416 and first upper portion 413 of the button 410 may have the same general shape or may be of different shapes. As one example, both may be oblong (e.g., lozenge-shaped). The collar 416 is positioned above or otherwise disposed on the first shelf 418. Generally, the upper button portion 413, collar 416, first shelf 418, and second shelf 420 may all be formed integrally with one another or may be formed separately and affixed to one another.

The first shelf 418 of the button 410 is typically wider and/or longer than the collar 416. In some embodiments, the first shelf 418 is of similar or identical width to the first upper portion 413. The first shelf 418 may have the same shape as either or both of the upper portion 413 and collar 416, or may have a different shape.

Figure 7:
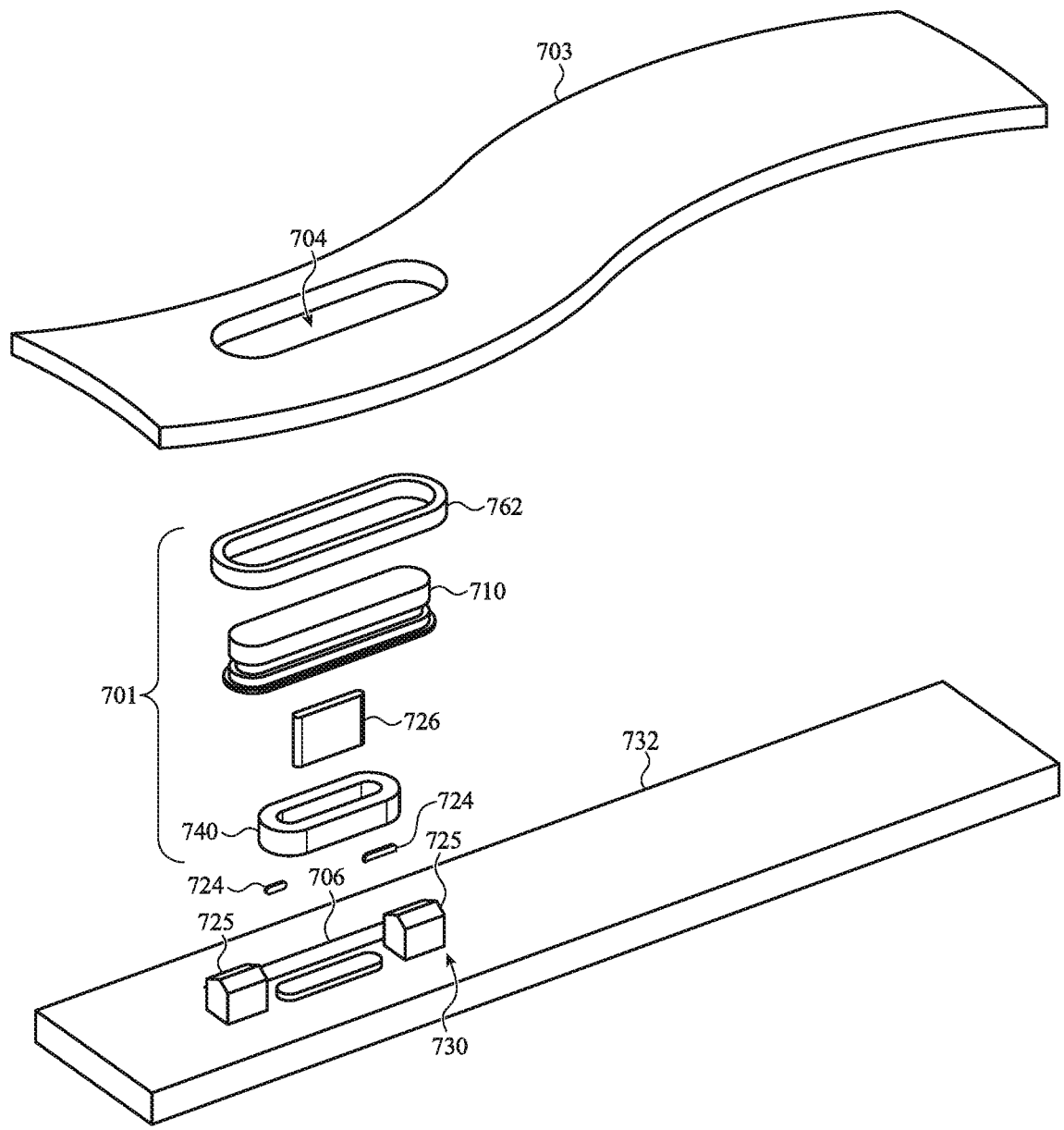
FIG. 7 is a sample exploded view of a pivoting input device.

The first shelf 418 and/or the collar 416 may receive a gasket (see, for example, FIG. 7.) More specifically, the first shelf 418 and/or the collar 416 may receive a gasket that encircles one or more of the first shelf 418 and/or the collar 416. The first shelf 418 is positioned above or otherwise disposed on the second shelf 420. The first shelf 418 is positioned between the collar 416 and the second shelf 420.

The second shelf 420 of the button 410 is generally wider and/or longer than the first shelf 418. The second shelf 420 may have a similar shape as one or more of the first upper portion 413, the collar 416, and the first shelf 418 of the button 410, or may be differently-shaped. The second shelf 420 may receive a gasket (see, for example, FIG. 7.) More specifically, the second shelf 420 may receive a gasket that is disposed on the second shelf 420. The second shelf 420 is positioned below the first shelf 418. The second shelf 420 is positioned between the first shelf 418 and connector 422.

Generally, the first shelf, collar, and second shelf cooperate to define a grove, annulus, or the like extending around a perimeter of the button 410. A gasket or other seal may be seated in this groove, as discussed in more detail below and mentioned above.

The connector 422 is positioned below the second shelf 420 and connects the button 410 to the permanent magnet 426. The connector 422 may be positioned at a central portion of the upper surface of the permanent magnet 426. The connector 422 may be connected to the permanent magnet 426 along substantially all of the length of an upper surface of the permanent magnet 426. The permanent magnet may be rigidly connected to the button 410 by way of the connector 422. In some embodiments, the permanent magnet 426 extends into a space within the body 430. That is, the body may be hollow or may have multiple projections defining a space receiving at least part of the permanent magnet 430.

The body 430 includes an upper body 432 and a lower body 436. Each of first projection 433 and second projection 434 are part of upper body 432; the first and second projections define a volume or space therebetween in which part of the permanent magnet 426 rests. The upper body 432 and a lower body 436 are separated by a region of reduced width configured to receive an electromagnet 440. The body may be attached to an enclosure of the electronic device, or a structure within the enclosure.

The electromagnet 440 is configured to attach to body 430 and positioned relative to the permanent magnet 426 such that a magnetic field generated by the electromagnet 440 is received by the permanent magnet 426 sufficient to displace or move the permanent magnet 426. The electromagnet 440 encircles the body 430 (specifically, the first and second projections 433, 434 and is positioned between the upper body 432 and the lower body 436. More specifically, the electromagnet 440 is positioned to fit around a region of reduced width formed between the upper body 432 and the lower body 436. The electromagnet 440 has a sidewall 446. Generally, the electromagnet 440 is located below the button 410 (or other input structure) and its input surface 412.

The positioning of the permanent magnet 426 relative to the electromagnet 440 modifies the operation (e.g., actuation) of the button 410. More specifically, the magnetic interaction between the electromagnet 440 and the permanent magnet 426 is influenced by the relative positioning of the permanent magnet 426 with respect to the electromagnet. In the embodiment of FIGS. 4A-4C, the lower surface 428 of the permanent magnet 426 is positioned between ends of the electromagnet 440. Stated another way, a horizontal plane extending from the lower surface 428 of the permanent magnet 426 intersects a sidewall of the electromagnet 440. In one embodiment, the horizontal plane extending from the lower surface 428 of the permanent magnet 426 intersects the sidewall 446 of the electromagnet 440 at a midpoint of the sidewall 446 (e.g., the end of the permanent magnet 426 is coplanar with a midpoint of the sidewall 446). Thus, the permanent magnet 426 extends halfway through the electromagnet 440.

In some embodiments, the permanent magnet 426 may be replaced by a second electromagnet, or may be supplemented by a second electromagnet. Using an electromagnet in place of, or in addition to, the permanent magnet 426 may facilitate fine control of the magnetic force exerted on the button 410 (or other input structure), thereby likewise providing fine control of the force of the haptic output. It should be appreciated that haptic output via the button 410 or other input structure may be increased by increasing the field strength of the second electromagnet or decreased by decreasing its field strength. Likewise, field strength of the first electromagnet 440 may be varied to vary haptic output force even when a permanent magnet 426 is used instead of a second electromagnet.

Further, it should be noted that such variations in field strength generally vary haptic output force, but not travel; a distance traveled by the input structure (e.g., button 410) and associated input surface varies with the distance of the pivot point from the input surface, as discussed above. Increases in both haptic output force and travel distance may increase force and/or perceptibility of a haptic output.

The electromagnet 440 is formed of multiple windings of wire. In one embodiment, the windings of wire comprise copper. In some embodiments, the windings of wire include any of copper, aluminum, metals, and/or or metal alloys that may be used as wire windings to generate a magnetic field, as known to those skilled in the art. In some embodiments, the strength of the magnetic field generated by the electromagnet 440 is supplemented with placement of a core material within the interior volume of an electromagnet formed by windings of wire. Such a magnetic core may be made of, for example, a ferromagnetic material such as iron. A magnetic core increases the strength of a generated magnetic field. Such a magnetic core may be inserted in any of several ways, such as one or more plates positioned within the interior volume of a wire-wounded electromagnet.

With attention to FIGS. 4B-4C, the button 410, and attached permanent magnet 426, are depicted in a neutral, unactuated first button position (as shown in FIG. 4B, which is a cross-section taken along line 4A-4A of FIG. 4A) and in an actuated second button position (FIG. 4C). The button 410 actuates or pivots between the first button position and the second button position through reaction of the permanent magnet 428 to a magnetic field generated by the electromagnet 440.

The button 410 is attached to the permanent magnet 426 by way of connector 422; in many embodiments, the ends of the connector 422 define the pivots 424. The button 410 is configured to pivot on the body 430 by way of the pair of pivots 424. In other embodiments, the connector and pivot(s) may be separate elements. The body 430, permanent magnet 426, and electromagnet 440 may be disposed within a host electronic device.

The electromagnet 440, which may encircle at least a portion of the permanent magnet 426, generates a magnetic field which interacts with the permanent magnet 426, in turn pivoting the button 410 between a neutral, unactuated first button position and an actuated, second button position as discussed in more detail below.

When no electric current is flowing through the wire windings of the electromagnet 440, no magnetic field is generated by the electromagnet 440 and the permanent magnet 426 is in a neutral position that is approximately in the middle of the electromagnet's interior volume 444, as shown in FIG. 4B, with one end within the interior volume. This corresponds to a neutral, unactuated first button position. However, when the electromagnet 440 is turned on, the resulting magnetic field moves (e.g., tilts) the permanent magnet 426 within the interior volume 444. More specifically, the permanent magnet 426 tilts or rotates about the pivot(s) 423, 424 such that its end 428 moves closer to one side of the electromagnet 44, as shown in FIG. 43C. Since the button 410 is attached to the permanent magnet 426, it also moves about the pivot(s) in a direction opposite the motion of the permanent magnet. Put another way, the button (or other input surface) and permanent magnet both rotate in the same direction (e.g., clockwise or counterclockwise) but move in opposite directions, since they are positioned on opposing sides of the pivot(s). Thus, when the electromagnet is activated, the button 410 moves into an actuated position. This motion may provide haptic feedback to a person touching the button 410 (and typically, the button's input surface 412) to indicate the input device 401 has been actuated. In some embodiments, the button 410 and permanent magnet 426 may oscillate back and forth about the pivot 424 to provide haptic feedback.

The permanent magnet 426, when influenced by the magnetic field, moves from its neutral position (as shown in FIG. 4B) to its actuated position, as shown in FIG. 4C. In its neutral position, the permanent magnet's 426 centerline is generally aligned with a major axis of the input device 401, as is a centerline of the button 410. In the actuated position shown in FIG. 4C, the centerline of the button 412 and permanent magnet 426 is offset from the major axis 439 of the input device 401 by an angle 411. The angle between the centerline of the button 412 and the major axis 439 is generally the same as the angle between the centerline of the permanent magnet 426 and the major axis 439.

The button/permanent magnet centerline 419 and the major axis 439 intersect at a pivot point 425. The pivot point 425 is positioned at the bottom of a pivot 424; the pivot 424 is not visible in FIGS. 4B-4C but is shown in FIG. 4A. The permanent magnet 426, and thus the button 410, rotates about the pivot point in a plane defined by the major axis 439 and the minor axis 441 of the input device 401. Typically, although not necessarily, the major axis 439 passes through the input surface 412 and button 410, while the minor axis 441 is parallel to the input surface and button. Likewise, the pivot axis (which passes through the pivot point 425) is generally parallel to the input surface.

The direction of rotation about the pivot point 425 may change with the direction of current passing through the electromagnet 440; thus, the button 410 and permanent magnet 426 may both rotate in two directions (e.g., clockwise or counterclockwise about the pivot point 425). As previously mentioned, the permanent magnet 426 and button 410 generally move in opposite directions while rotating about the pivot point 425 and any associated pivot(s) 424.

A user receives haptic feedback from the button 410 actuation in that the input surface 412 of the button 410 pivots with the button 410. A user touching the input surface 412 may sense the pivoting or actuation of the button 410. Furthermore, the user may be able to see the pivoting of the button 410 from the neutral, unactuated first position to the actuated, second position.

The button 410 (or other input structure) may include a force sensor 417 below the input surface 412 and within the upper portion 413; the force sensor is shown in FIG. 4B, although it should be appreciated that the location of the force sensor 417 may vary in alternative embodiments. For example, the force sensor 417 may be positioned below the input surface 412 and the upper portion 413 instead of within the upper portion, or may be positioned below or to the side of the permanent magnet 426, or anywhere else within the input device (or on a portion of an associated electronic device's enclosure). The force sensor 417 senses an input force on the input surface 412 and produces an output signal. The force sensor 417 may be any type of force sensor 417 known to those skilled in the art, such as a strain gauge, a capacitive sensor, a resistive sensor, an optical sensor, and so on. If the force sensor 417 is a capacitive sensor, for example, changes in capacitance may be sensed by the sensor 417 and output as an electrical output signal to the processor. In one embodiment, the force sensor is a strain gauge. The output signal produced by the force sensor 417 is received by a processor. More discussion regarding force sensors as components of a pivoting input device is provided with respect to FIGS. 11A-11E below.

In one embodiment, a processor is electrically connected to the input device 401, for example to the force sensor 417. In one embodiment, the processor is disposed within an enclosure of an electronic device incorporating the input device 401.

The output signal generated by the force sensor 417 allows the processor to control, for example, the electromagnet 440 (or other actuator) to effect actuation of the button 410 and may also be used as a system input to the electronic device. For example, the force sensor output may be used to indicate that a user has pressed or otherwise interacted with the button 410 and thus control or change some function of the electronic device.

The processor also may control any of several inputs to the electromagnet 440 to vary the magnetic field generated by the electromagnet 440. For example, the processor may control the current running through the wire of the actuator 440. Generally, an increased current will result in an increase in magnetic field strength, thereby moving the permanent magnet 426 more quickly and increasing the haptic output's strength.

The processor may control additional aspects of the electromagnet 440. For example, upon receipt of the force sensor's 417 signal, the processor may power up the electromagnet and/or alter the state of the electromagnet so as to ready the electromagnet 440 to generate a magnetic field to actuate the button 410. Such a scenario may occur if the electromagnet is consistently powered on but at a level that generates a magnetic field of a size and/or strength that does not pivot the permanent magnet 426. Upon receipt of the output signal from the force sensor 417, the processor may control the electromagnet 440 to move from stand-by status to a full power-on mode, thereby actuating the button 410 by moving the permanent magnet 426. In some embodiments, the input device 401 may be configured to actuate (e.g., the button moves) only upon receiving an input exceeding a threshold force level, below which no actuation is triggered. The processor may also receive an output signal from a touch sensor (discussed below with respect to FIG. 6.) Additional description of processor operations is found below with respect to FIG. 12.

In some embodiments, motion of the permanent magnet 426 within the electromagnet 440 may be sensed by measuring the back electromotive force (EMF) of the electromagnet. Generally, the EMF induced in the electromagnet will vary with a magnitude of the permanent magnet's 426 travel. Further, as a user presses harder on the input surface 412 or otherwise more rigidly constrains the input surface with his or her finger, the permanent magnet's travel reduces. Thus, if a user has a "stiff" input, the input structure 410 (e.g., button) travel is constrained and this may be sensed by measuring the back EMF of the electromagnet 440 via a sensor. A user may provide a stiff input if the user is exerting high force on the input surface 412, is wearing gloves, has dry skin, a calloused finger, and so on. Generally, conditions that yield a stiff input also reduce sensitivity to haptic output. Accordingly, when the back EMF of the electromagnet 440 is exceeds a threshold, a processing unit of the input device 401 may direct additional power to the electromagnet 440 to increase the force and perceptibility of haptic output.

The button 410 may be positioned in an opening along an exterior surface of an electronic device, such that the button presents an input surface to a user. The button 410 may be conformal with the exterior surface, or may project from the exterior surface of a host electronic device. In one embodiment, the button 410 is oblong and fits along an exterior edge of an electronic device, such as a mobile phone.

The button 410 may actuate (e.g., move) in any of several ways. In the embodiment of FIGS. 4A-4C, the button 410 pivots off the major axis 439 of the input device 401, which is generally perpendicular to its pivot axis. However, other configurations are possible. For example, the button 410 may be configured to actuate along a minor axis. In some embodiments, the button 410 may actuate in a seesaw manner. In some embodiments, the button 410 moves along a surface or edge of a host electronic device.

In one embodiment, although the button 410 may actuate, the actuation is not required to register a button input to an electronic device, such as to register a button input by a processor of an electronic device. Stated another way, the physical movement or actuation of the button 410 is not required to register a button on or off input. Instead, the button actuation is effected to provide a type of haptic feedback to the user.

The button 410 may have a variety of shapes, including defining a curved or convex input surface 412, and/or may be rectangular, square, and so on. As another example, the input surface 412 may be substantially flat. The input surface 412 and/or other parts of the button 410 may include texture such as bumps, ridges, or the like. The button 410 may have radiused, beveled, or flat edges. Generally, the smaller the curvature of the input surface 412, the greater the shear (e.g., transverse displacement) of the user's skin contacting the input surface and thus the greater the perceptibility of the haptic output. Accordingly, travel of planar input surfaces 412 may be more easily perceived by a user than the same travel of a curved input surface. The curvature of the input surface 412 may be selected to impart a particular haptic output or particular perceptibility of a haptic output.

Generally, if the curvature of the input surface 412 equals the curvature of an arc segment along which the input surface 412 travels during rotation of the input structure 410 about the pivot, the skin of a user's finger in contact with the input surface 412 experiences purely tangential motion from the input surface. The "arc segment" is the portion of a circle through which a point on the input surface moves while the input structure rotates. Put another way, if every point of an input surface 412 lies on a single arc circumscribed by the entirety of the input surface 412 while haptic output is provided, then the curvature of the input surface equals the curvature of an arc segment. Put still another way, if the distance from the pivot 424 to every point of the input surface within the rotational plane is equal, then the curvature of the input surface 412 matches the curvature of the arc segment during rotation. Purely tangential motion of the input surface 412 against a user's skin yields a high degree of skin shear and a unique feeling of haptic output. Generally, such haptic output is indistinguishable or near-indistinguishable from a "click" or depress of a typical button that moves in the direction of an input force.

By changing the curvature of the input surface 412, the feel of the haptic output may be varied. The more the curvature of the input surface varies from the arc segment along which the input surface 412 travels during rotation, the more the haptic output feels like a "rocking" motion to a user as opposed to a "clicking" or depressing/collapsing motion. The curvature of the input surface 412 may be tuned to provide particular haptic outputs, as desired or necessary.

FIGS. 4A-C illustrate another embodiment of a pivoting input device 501. The pivoting input device 501 is similar to the embodiment of FIGS. 4A-4C except that the pivoting input device 501 includes a retainer 550 and gasket 522 coupled to an upper portion of a button 510 (or other input structure), and employs a pair of pins 554 rather than pivots. The pins 554 fit between the body 530 and the button 510, and allow the button and permanent magnet 526 to rotate relative to the body 530.

The button 510 defines an input surface 512 and incorporates a force sensor 517, although in other embodiments the force sensor may be positioned in different areas as described above with respect to FIGS. 4B-4C. The input surface 512 of button 510 may be touched, pressed, or otherwise interacted with by a user. The button 510 engages the retainer 550, which is located below the button 510. A gasket 522 is disposed below the retainer 550 and above pins 554.

The retainer 550 may be disposed or positioned between the button 510 and the body 530. More specifically, the retainer 550 may be positioned at a first end of the body 530, between an edge of the body adjacent the first body surface 533 and an outer edge of the button 510. The retainer may conceal the pins 542, permanent magnet 526, and/or electromagnet 540 from view when the input device 501 is installed in an electronic device. The retainer may contrast with the button 510 to enhance visibility of the button and/or retainer. This may call attention to the button 510, thereby indicating to a user where he or she can provide input.

The gasket 522 is positioned below the retainer 550. In some embodiments, it may encircle the retainer 550 and/or a portion of the button 510, although this is not necessary. The gasket 522 may provide a seal between the button 510 and the interior volume 544 of the electromagnet 540. A "seal," as used herein, may be used to refer to closing off an opening or a connection. When referenced to a part or component, the term "seal" may refer to an element or a group of elements that blocks or inhibits the ingress or entry of foreign debris or contaminants.

The body 530 includes an upper body 532 and a lower body 536. A portion of the upper body 532 has a reduced thickness and is encircled by an electromagnet 540. The lower body 536 may be attached to a structure within an enclosure of a host electronic device, or directly to the enclosure itself, in order to anchor the input device 501 to the electronic device.

The pins 554 connect the body 530 to the permanent magnet 526 (or, in some embodiments, the button 510). Each pin 554 extends into the body 530 and also extends into the electromagnet 526 or button 510. The pins 554 are axially aligned with one another and are positioned on opposite ends of the electromagnet 526 or button 510. The pins 554 allow the button to rotate relative to the body 530, similar to the pivots in the embodiment of FIGS. 4A-4C.

Figure 5A:
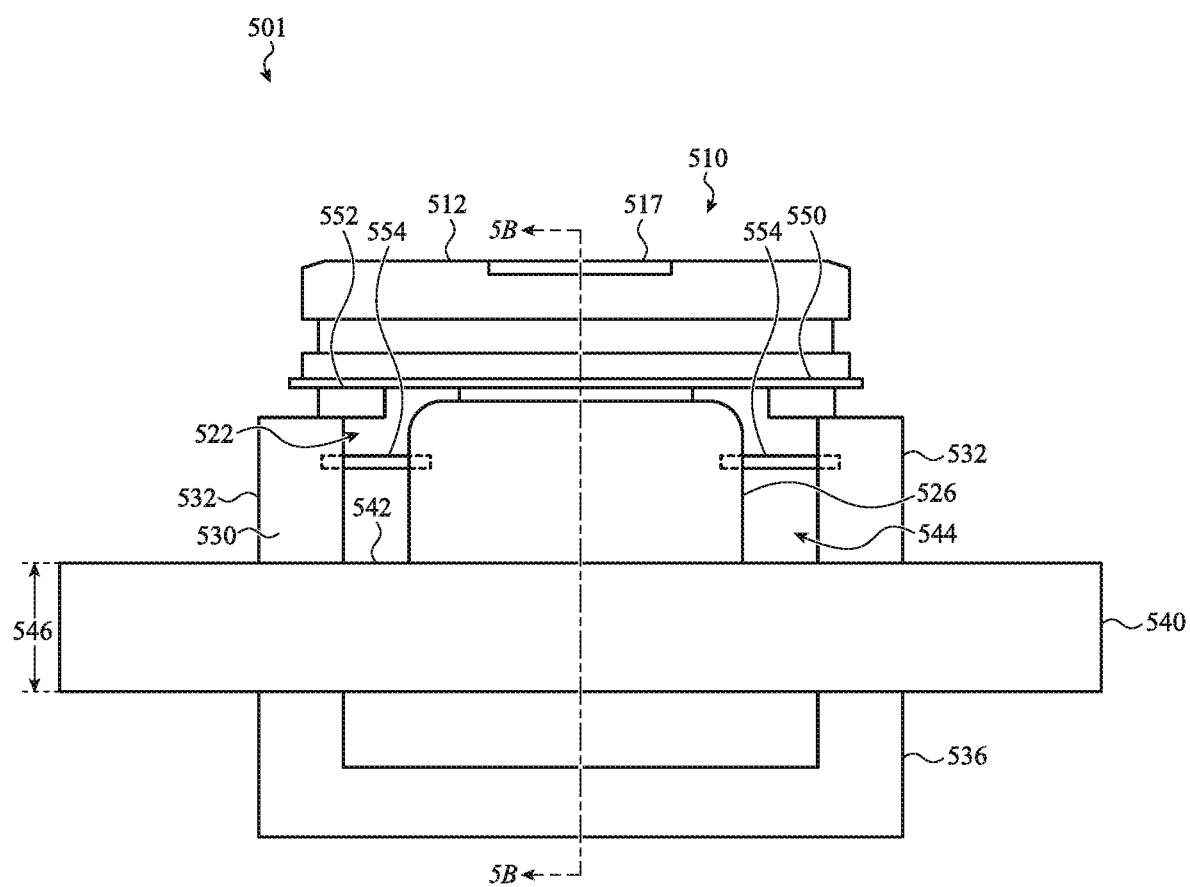
FIG. 5A is a sample side view of another embodiment of a pivoting input device in an unactuated state.
Figure 5B:
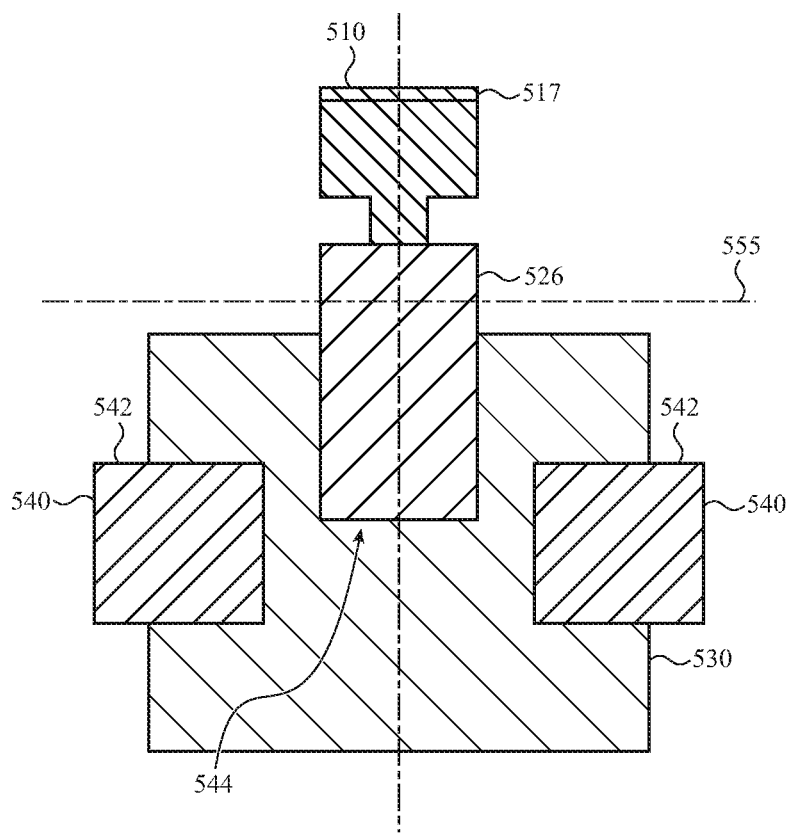
FIG. 5B is a cross-section view of the pivoting input device of FIG. 4A taken along line 4B-4B.
Figure 5C:
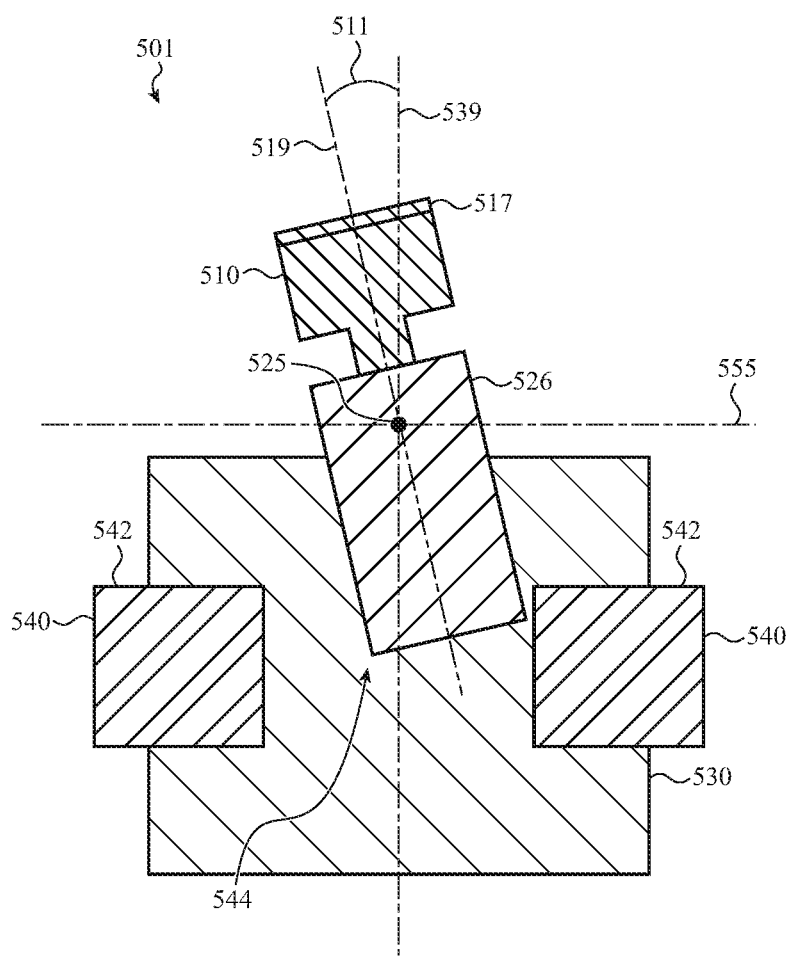
FIG. 5C is a cross-section view of the pivoting input device of FIG. 4A in an actuated state.

The permanent magnet 526 is attached to a lower surface of the button 510. The permanent magnet 526 may be rigidly attached to the button 510, such that the permanent magnet 526 moves or displaces in concert with the button 510. The permanent magnet 526 may be affixed to the button 510 by a connector as with the embodiment of FIGS. 4A-4C, or may be affixed directly to the button 510. As shown in FIGS. 5A-5C, the electromagnet 526 is affixed directly to the body 510.

The button 510 pivots relative to the body 530 about the pins 554. The pins 554 may rotate within an interior volume disposed within the body 530 and/or rotate within an interior volume disposed within the button 510. In one embodiment, the pins 554 may be fixed and not rotate within an interior volume disposed within the body 530 or within an interior volume disposed within the button 510.

The electromagnet 540 is positioned relative to the permanent magnet 526 such that a magnetic field generated by the electromagnet 540 passes through the permanent magnet 526. As with prior embodiments, the permanent magnet 526 may move (e.g., rotate) when the electromagnet 540 generates its magnetic field. The electromagnet 540 encircles the body 530, as previously mentioned. The electromagnet 540 has a sidewall 546.

As discussed with regards to the embodiment of FIGS. 4A-4C, the positioning of the permanent magnet relative to the electromagnet influences the operation or actuation of the button. More specifically, the magnetic interaction between the electromagnet 540 and the permanent magnet 526 is influenced by the relative positioning of the permanent magnet 526 with respect to the electromagnet 540. In the embodiment of FIGS. 5A-5C, the lower surface 528 of the permanent magnet 526 is positioned within the electromagnet 540 while a portion of the permanent magnet projects above the electromagnet.

The electromagnet 540 may be formed from multiple wire windings, similar to the electromagnet 440 of the embodiment of FIGS. 4A-4C. In some embodiments, an actuator other than an electromagnet 540 may be used. For example, an actuator made of a shape-memory alloy, such as nitinol, may be used. The nitinol may be heated by an electric current, as one example; once the nitinol is heated sufficiently, its shape may change. The nitinol may be affixed to the button 510 such that a change in shape of the nitinol exerts sufficient force to rotate the button 510 about the pins 554 extending through the pivot point 525. In some embodiments, piezoelectric actuators and/or reluctance actuators may be used. Other mechanical (e.g., springs, levers, detents, and the like) or electrical (such as electrostatic) actuators may be employed in this or any other embodiment discussed herein instead of electromagnets and/or magnets.

FIGS. 5B-5C are simplified cross-sectional views of the input device 510 shown in FIG. 5A and illustrate actuation of the device. In the cross-sectional view of FIG. 5B, which is taken along line 5B-5B of FIG. 5A, the button 510 and attached permanent magnet 526, are depicted in a first neutral, unactuated position. FIG. 5C shows the button 510 and permanent magnet 526 is a second, actuated position. The button 510 actuates or pivots between the first button position and the second button position in response to motion of the permanent magnet 526 caused by a magnetic field generated by the electromagnet 540, as discussed above with respect to FIGS. 4A-4C.

As discussed, the button 510 rotates about a pivot point 525 defined by the pins 554 and thus rotates, tilts, or pivots relative to the body 530. The body 530 may be disposed within a host electronic device (see, for example, FIG. 6) and remain stable with respect to the electronic device.

Similar to the embodiment of FIGS. 4A-4C, when no electric current is flowing through the wire windings of the electromagnet 540, no magnetic field is generated by the electromagnet 540, and the permanent magnet 526 is positioned in a neutral position, with one end approximately in the middle of the electromagnet's interior volume 544 as shown in FIG. 5B. However, when the electromagnet 540 is turned on, the permanent magnet 526 is influenced by the magnetic field and pivots/rotates within the interior volume 544 of the wire windings of the electromagnet 540. More specifically, an end of the permanent magnet 526 moves closer to one side of the electromagnet 540. This causes the button to likewise move, albeit in an opposite direction, to its actuated position.

The permanent magnet 526 is influenced by the magnetic field so as to pivot to an angle 511 from a body centerline 539. The angle 511 is defined by the button centerline 519 and the body centerline 539. The button centerline 519 and the body centerline 539 intersect at the pivot point 525. The pivot point 525 is positioned at the axial centerline of the pair of pins 554. The button 510 may also rotate in a direction opposite to that shown in FIG. 5C. The pivot point 525 defines a pivot axis; the pivot axis is generally parallel to the input surface.

The permanent magnet 526, when influenced by the magnetic field, moves from its neutral position of FIG. 5B to its actuated position, as shown in FIG. 5C. In its neutral position, the permanent magnet's 526 centerline 519 is generally aligned with a major axis of the input device 501, as is a centerline of the button 510. In the actuated position shown in FIG. 5C, the centerline 519 of the button 512 and permanent magnet 526 is offset from the major axis 539 of the input device 501 by an angle 511. The angle between the centerline of the button 512 and the major axis 539 is generally the same as the angle between the centerline of the permanent magnet 526 and the major axis 539.

The button/permanent magnet centerline 519 and the major axis 539 intersect at a pivot point 525. The pivot point 525 is defined by the position of the pins 554; the pins 554 are not visible in FIGS. 5B-5C but are shown in FIG. 5A. The permanent magnet 526, and thus the button 510, rotates about the pivot point 525 in a plane defined by the major axis 539 and the minor axis 555 of the input device 401. The direction of rotation about the pivot point 525 may change with the direction of current passing through the electromagnet 540; thus, the button 510 and permanent magnet 526 may both rotate in two directions. As previously mentioned, the permanent magnet 526 and button 510 generally move in opposite directions about the pivot point 525 and any associated pins 554, although they both rotate either clockwise or counterclockwise together about the pivot point 525. Such rotation (whether a single motion in one direction or oscillation) generates haptic feedback to a user, as described above.

The embodiment shown in FIGS. 5A-5C may incorporate a force sensor 517. The function of the force sensor 517 and its operation are similar to the function and operation of the force sensor 417 described with respect to FIGS. 4A-4C.

Figure 6:
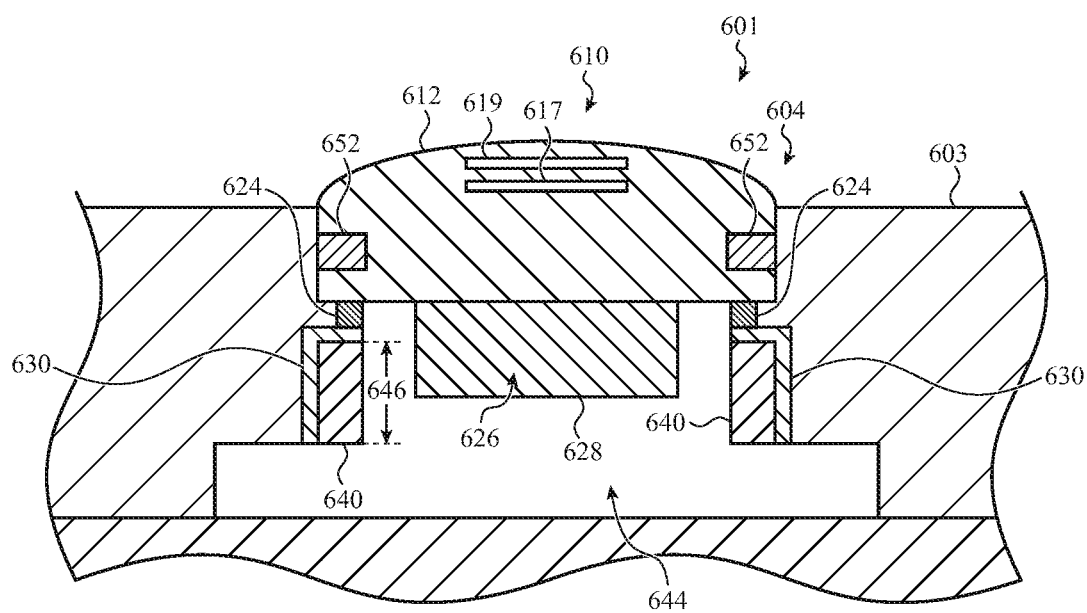
FIG. 6 is a sample cross-section view of another embodiment of a pivoting input device fitted to an enclosure of an electronic device.

FIG. 6 is a cross-section of another embodiment of a pivoting input device 601. The pivoting input device 601 is similar to the embodiment of FIGS. 4A-4C except that the pivoting input device 601 includes a gasket 652 coupled to an upper portion of a button 610, and a touch sensor 619 in addition to a force sensor 617. The touch sensor may be positioned on the input surface 612, at an edge of the button 610, below the button 610, and so on (as may the force sensor 617). The button 610 of the pivoting input device 601 is fitted within an opening 604 of an enclosure 603 of an electronic device 600.

The button 610 is an input structure that defines an input surface 612. A permanent magnet 626 is attached to a lower surface of the button 610. The permanent magnet 626 may be rigidly attached to the button 610, such that permanent magnet 626 moves or displaces in concert with the button 610, as discussed above with respect to other embodiments.

Similar to the embodiment of FIGS. 4A-4C, the button 610 pivots relative to the body 630 about one or more pivots 624 located below the input surface 612 of the button 610. The pivots 624 are attached to body 630 on each of two sides of the button 610, although a single pivot may run through or below the button.

The button 610 defines a groove, annulus, or other groove or recess, in which a gasket 652 is seated. The gasket 652 encircles the button 610 and functions as a seal between the button 610 and the opening 604 of the electronic device 600.

The body 630 secures the pivots 624 and surrounds the electromagnet 640. Each of the pivots 624 are disposed on an upper surface of the body 630. The body 630 may be attached to a structure within the interior volume 644 of the electronic device 600 or directly to the enclosure 603.

The electromagnet 640 is disposed within, and attached to, the body 630. As discussed above, an actuator other than the electromagnet 640 may be incorporated into the pivoting input device 601 in order to provide haptic output.

Generally, the input device 601 operates as discussed with respect to FIGS. 4A-4C, in that the electromagnet 640 generates a magnetic field that tilts or rotates the permanent magnet 626 and button 610 about the pivots 624. Haptic feedback may be provided to a user through the button 610 as described above; this haptic feedback may be a single motion (for example, a "click") or oscillation. Likewise, operation of the force sensor 617 is analogous to operation of the force sensor 417 of FIGS. 4A-4C. The touch sensor 619 may operate in place of, or in addition to, the force sensor 417 to sense an input. The touch sensor 619 may also function as a proximity sensor or may be replaced by a proximity sensor in some embodiments, or may be omitted entirely. The electromagnet 640 may remain off until the touch sensor 619 detects an input, or a proximity sensor detects an object (such as a finger, stylus, or the like) near the input surface 612.

In some embodiments, the proximity sensor may be fitted to or incorporated into the enclosure 603. In one embodiment, the proximity sensor is disposed within the interior volume 644 of the enclosure 603 and/or is embedded in the input surface 612.

FIG. 7 is a sample exploded view of portions of a pivoting input device 701 and a portion of an enclosure 703 of an electronic device.

One or more openings 704 are defined in the enclosure 703. The opening 704 is shaped to receive a button 710 of the input device 701. More specifically an upper portion of button 710, when fitted within opening 704, protrudes or projects from the enclosure 703. As previously discussed the button 710 defines an input surface 712. The input surface 712 may protrude from, or be accessible through, the opening 704. A force sensor (not shown in FIG. 7) may be positioned within the button 710 below the input surface, on a mounting plate supporting the input device 701, below the button 710 and input surface in another location, on a sidewall of the enclosure 703, and so on.

Gasket 762 is shaped to fit around a perimeter of the button 710. More specifically, gasket 762 fits around and/or contacts a groove defined by one or more of the set of shelves 418, 420 and collar 416, as described with respect to the embodiment of FIGS. 4A-4C. For example, with respect to FIG. 4B, in one embodiment, the gasket 762 may be disposed on second shelf 420 and encircle first shelf 418. In one embodiment, the gasket 762 may be disposed on second shelf 420 and encircle both first shelf 418 and collar 416. Returning to FIG. 7, the gasket 762 may be positioned around button 710 and below the enclosure 703.

The permanent magnet 726 is below the button 710 and attached to a lower surface of the button 710. In one embodiment, the permanent magnet 726 is attached to the button 710 by way of a connector, such as the connector 422 described with respect to the embodiment of FIGS. 4A-4C. In other embodiments, the permanent magnet 726 is attached to the button 710 directly.

Electromagnet 740 fits around a boss 706 of a mounting plate 732, and generally sits within the body 730. A front portion of the body 730 is removed in order to show the boss 706. One or more pivot points 725 are defined on the top of the body 730. The electromagnet 740 may be connected to the body 730, which in turn may be attached to an enclosure of an electronic device or a structure (such as the mounting plate 732) that is affixed to, or stationary with respect to, the enclosure. Likewise, a pivot 724 or pivots may connect the electromagnet 740 or button 710 to the body, as discussed above. As shown in FIG. 7 and discussed elsewhere herein, the pivot(s) 724 are generally below the button 710, or at least below the input surface 712 of the button.

The combined button 710 and gasket 762, with attached permanent magnet 726, are positioned such that at least a portion of the permanent magnet is received within an inner volume of the electromagnet 740.

As discussed above, the configuration of an electromagnet and the relative positioning of a permanent magnet to the electromagnet determine the kinematics of the permanent magnet (and thus the button attached to the permanent magnet.) More specifically, different configurations of the electromagnet produce different magnetic field configurations, and different relative positioning between the electromagnet and the permanent magnet result in different responses to the magnetic field.

Figure 8A:
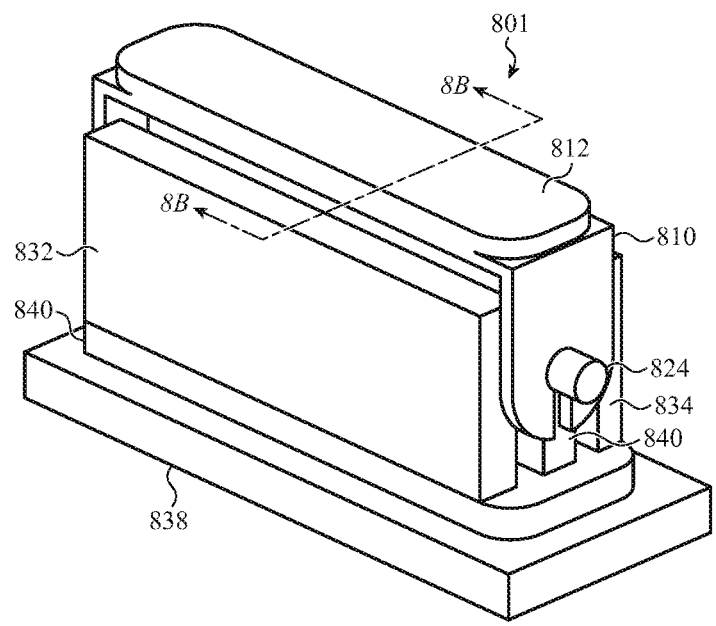
FIG. 8A is shows another embodiment of a pivoting input device.
Figure 8B:
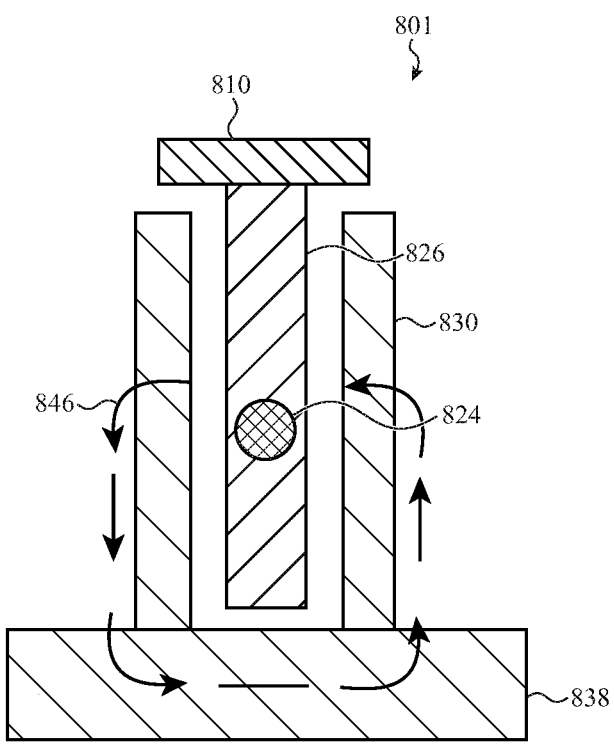
FIG. 8B is a cross-section view of the pivoting input device of FIG. 8A taken along line 8A-8B.

FIGS. 8A-8B illustrate another sample pivoting input device 801. The pivoting input device 801 is similar to the embodiment of FIGS. 4A-4C. Here, the pivoting input device 801 employs one or more pins 824 affixing the button 810 to the electromagnet 840, and the electromagnet 840 is positioned entirely below the permanent magnet 826. The pins 824 allow the button 810 to rotate relative to a host electronic device. Note that FIG. 8B is a cross-section taken along line 8B-8B of FIG. 8A.

With attention to FIGS. 8A-8B, the pivoting input device 801 includes a button 810 attached to a permanent magnet 826 by one or more pins 824. The button 810 also is attached by the more pins 824 to a central post affixed to the base 838 or one or both of the sidewalls (the post is omitted in order to show details of the input device 801). Generally, there is a central post at each end of the button but only one is visible in FIG. 8A. The pins 824 also pass through a permanent magnet 826 that is affixed to the button 810. As with other embodiments, the button 810 defines an input surface 812 that may be touched or pressed by a user.

Sidewalls 832, 834 are positioned on either side of the permanent magnet 826; the sidewalls 832, 834 are separated from the permanent magnet 826 by a gap. The sidewalls may be made from a ferritic (or magnetic) material and function to provide a path for, and contain, the magnetic field 846 generated by the electromagnet 840, as discussed below. In some embodiments the sidewalls are made from a non-ferritic material. In some embodiments, the sidewalls 832, 834 are magnetic and repel the permanent magnet 826 when the permanent magnet is in its neutral position, thereby keeping the permanent magnet in such a position.

The sidewalls 832, 834 may be mounted to the electromagnet 840, which in turn may be mounted on a base 838. Accordingly, the electromagnet 840 is positioned below the permanent magnet 826. The central post(s) are likewise typically mounted to the base 838. The base, in turn, may be attached to an enclosure of an electronic device.

Generally and as shown in FIGS. 8A-8B, the button 810 does not contact either sidewall 832, 834 in its neutral position or during operation. Likewise, the permanent magnet 826 does not contact the sidewalls 832, 834 in its neutral position. The permanent magnet 826 may contact the sidewalls during operation, or the magnetic field may be controlled to prevent such contact.

In order to cause the permanent magnet 826 and button 810 to pivot about the pins 824, the electromagnet 840 is actuated. The electromagnet produces a magnetic field 846 as represented by the dashed arrows in FIG. 8B. It should be appreciated that flux of the magnetic field may be reversed from the direction shown in FIG. 8B as well. The magnetic field passes through, and is optionally shaped by, the sidewalls 832, 834. Put another way, the sidewalls 832, 834 may form part of a return path for the magnetic field.

The magnetic field 846 also passes through the permanent magnet 826. The permanent magnet 826 experiences force along the field lines of the magnetic field 846. Since the permanent magnet 826 is constrained by the pin(s) 824, it cannot translate or otherwise move laterally. Rather, the force causes the permanent magnet 826 to rotate or pivot about the pin(s) 824. As with other embodiments, this induces an opposite pivoting motion in the button 810 attached to the permanent magnet. This, in turn, may provide haptic and/or visual feedback to a user.

The direction and strength of the magnetic field 846 may be controlled to re-center and stabilize the permanent magnet 826 (and thus the affixed button 810) in its neutral position.

Figure 9A:
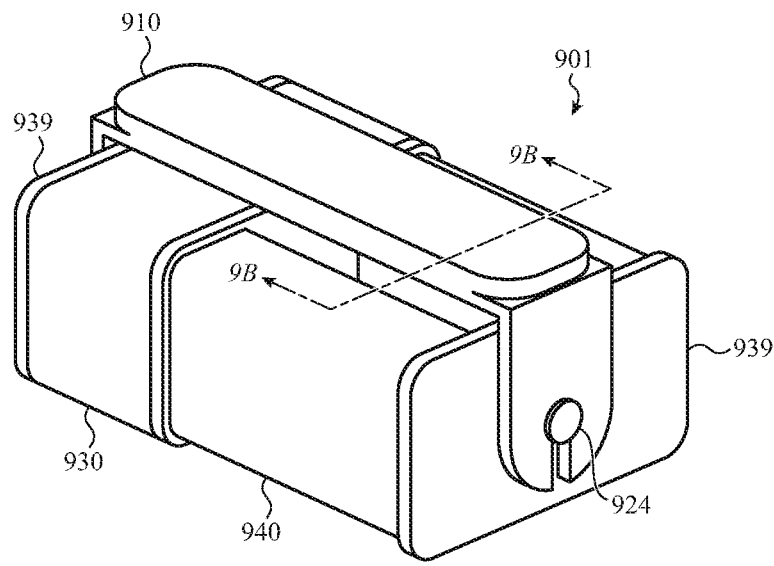
FIG. 9A shows another embodiment of a pivoting input device.
Figure 9B:
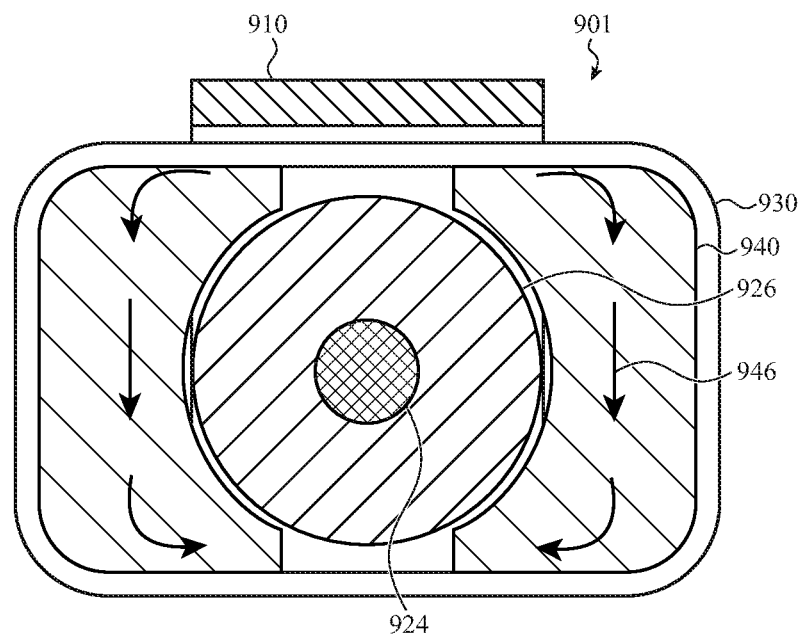
FIG. 9B is a cross-section view of the pivoting input device of FIG. 9A taken along line 9B-9B.

FIGS. 9A-9B illustrate another embodiment of a pivoting input device 901. FIG. 9B is a cross-section taken along line 9B-9B of FIG. 9A. The pivoting input device 901 is similar to the embodiment of FIGS. 8A-8B, but here the electromagnet 940 encircles the permanent magnet 926, and the permanent magnet 926 is attached to the button 910 at locations at or adjacent to the pins 924. The pins 924 allow the button 910 to rotate relative to the electromagnet 940. The electromagnet may be at least partially contained within a body 930 through which the pins 924 pass. The electromagnet 940 is generally stationary with respect to the body 930 while the button 910 and permanent magnet 926 rotate and/or translate relative to the body during actuation.

The permanent magnet 926 is positioned in a neutral position within, and approximately in the middle of, an interior volume of the electromagnet 940. The permanent magnet 926 is generally cylindrical or rectangular, optionally with rounded corners. The permanent magnet 926 is configured to fit, at each end point, around a respective pin 924. The permanent magnet 926 and the electromagnet 940 are fitted between opposing sides of end bodies 939.

With attention to FIG. 9B, when a current flows through the windings of the electromagnet 940, the electromagnet 940 produces a magnetic field 946 extending around and encircling the permanent magnet 926, resulting in a torque or twisting force on the permanent magnet 926. This rotates the permanent magnet 926 about the pins 924, thereby rotating or actuating the attached button 901.

Figure 10A:
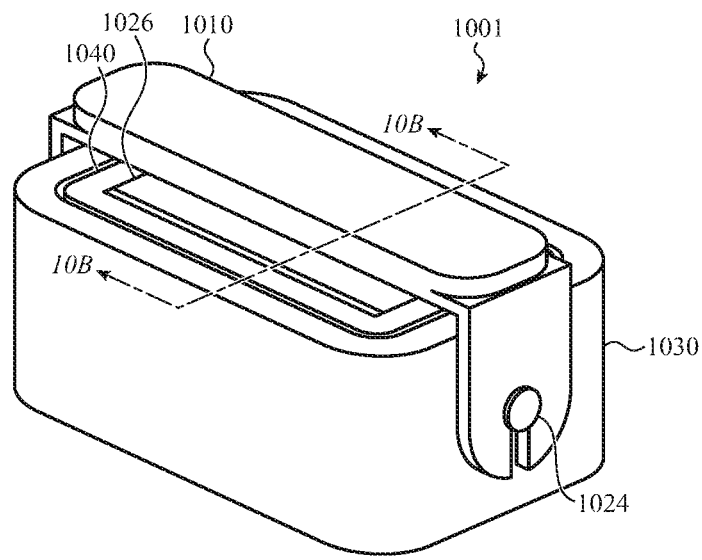
FIG. 10A shows yet another embodiment of a pivoting input device.
Figure 10B:
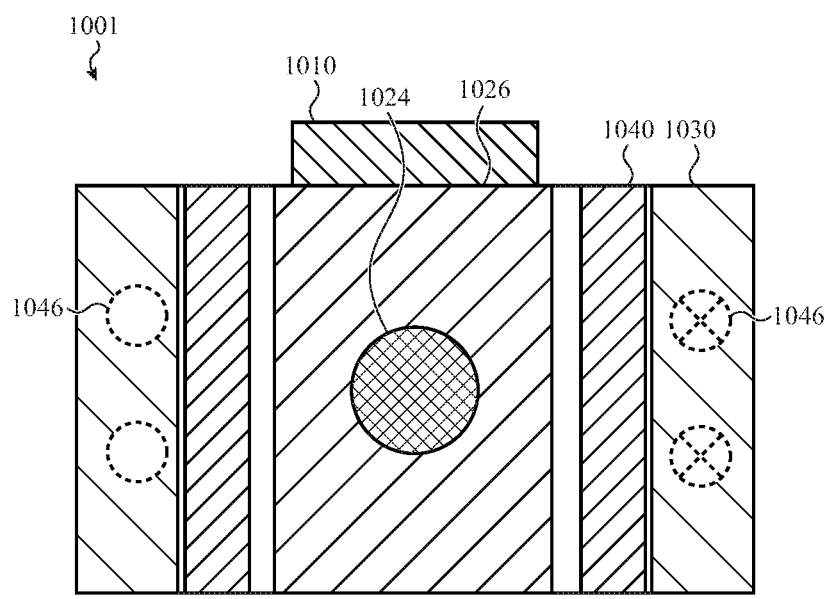
FIG. 10B is a cross-section view of the pivoting input device of FIG. 10A taken along line 10B-10B.

FIGS. 10A-10B illustrate another embodiment of a pivoting input device 1001. FIG. 10B is a cross-section taken along line 10B-10B of FIG. 10A. The pivoting input device 1001 is similar to the embodiment of FIGS. 9A-9B except that the electromagnet 1040 is rotated 90 degrees with respect to the prior embodiment. The electromagnet 1040 encircles the permanent magnet 1026. The permanent magnet 1026 is attached to the button 1010, as with prior embodiments. A set of two pins 1024 are located at opposite ends of the button 1010 and attached to the body 1030. The pins 1024 allow the button 1010 to rotate relative to the body and any electronic device to which the body is attached. With attention to FIG. 10A, the permanent magnet 1026 is configured to fit within the electromagnet 1040. The permanent magnet 1026 is positioned in a neutral position within an interior volume of the electromagnet 1040.

With attention to FIG. 10B, the electromagnet 1040 produces, when a current flows through the windings of the electromagnet 1040, a magnetic field 1046 extending around and encircling the permanent magnet 1026 in longitudinal planes, resulting in a torque or twist force on the permanent magnet 1026. This rotates the permanent magnet 1026 about the pins 1024, thereby rotating or actuating the button 1010. In the orientation shown in FIG. 10B, the magnetic field extends in and out of the page (e.g., is generally in a plane parallel to the pins 1024), while rotation of the permanent magnet 1026 is in-plane with the cross-section as shown.

FIGS. 11A-11E illustrate various embodiments of an electromagnetically-driven pivoting input device with a force sensing capability. The force sensing capability may be coupled to electromagnetic components of the button, or may operate independently of the electromagnetic components. The force sensor may be any of several types known in the art, including Hall effect sensors, strain sensors, capacitive sensors, and optical sensors.

Figure 11A:
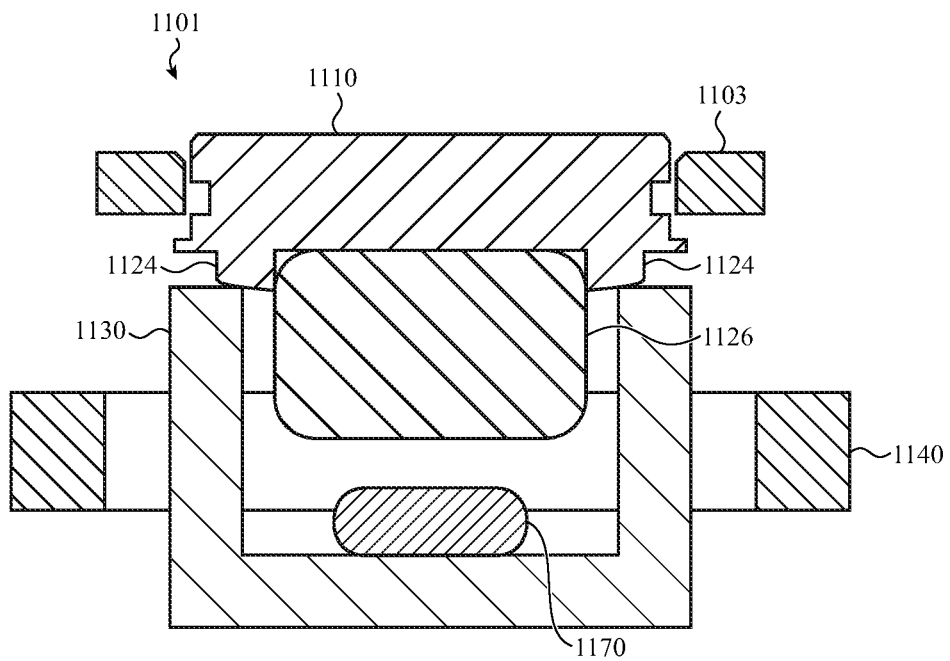
FIG. 11A is a sample side view of another embodiment of a pivoting input device.

With attention to FIG. 11A, another embodiment of a pivoting input device 1101 is depicted. The pivoting input device 1101 is similar to the embodiment of FIGS. 4A-4C except that the pivoting input device 1101 includes a Hall effect force sensor 1170 and the button 1110 includes a pair of pivots 1124 integrated with the button 1110.

The pivoting input device 1101 is depicted as a button system with button 1110 fitted to an enclosure 1103 of an electronic device. A permanent magnet 1126 is attached to a lower surface of the button 1110. The permanent magnet 1126 may be rigidly attached to the button 1110, such that permanent magnet 1126 moves or displaces in concert with the button 1110.

The button 1110 pivots relative to the body 1130 by way of an integrated pair of pivots 1124. The pair of pivots 1124 are formed from the button 1110 on a lower surface of the button 1110. Each of the two pivots 1124 are positioned between the lower surface of the button 1110 and an upper surface of the body 1130. An input surface of the button 1110 may be touched, pressed, or otherwise interacted with by a user.

The electromagnet 1140 is configured to attach to body 1130 and positioned relative to the permanent magnet 1126 such that a magnetic field generated by the electromagnet 1140 is received by the permanent magnet 1126 sufficient to displace or move the permanent magnet 1126. The electromagnet 1140 is positioned to encircle the body 1130.

A Hall effect sensor 1170 is positioned on a lower portion of the body 1130, below the permanent magnet 1126. The Hall effect sensor 1170 may be positioned such that a portion of the Hall effect sensor 1170 is within a portion of the interior volume defined by the electromagnet 1140. In some embodiments, the Hall effect sensor 1170 is positioned entirely below the electromagnet 1140. Other positions for the Hall effect sensor 1170 are possible, such as along an edge of the body 1130.

Generally, a Hall effect sensor provides a voltage output in response to a magnetic field. In one Hall effect sensor configuration, a metal strip provides a current along a length. In the presence of a magnetic field, the flowing electrons of the current will deflect to an edge of the metal strip, perpendicular to the metal strip length, causing a measurable voltage change across the width of the metal strip.

The Hall effect sensor 1170 may be calibrated to detect a change in magnetic field caused by a vertical movement of the button 1110. More specifically, a vertical movement of the button 1110 (caused by, for example, a force input to a surface of the button 1110), will vertically move the permanent magnet 1126 attached to the button 1110, thereby causing a change in the magnetic field of the electromagnet 1140, as measured by the Hall effect sensor 1170. The Hall effect sensor 1170 may be calibrated to remove magnetic field change measurements caused by rotation of the button 1110 about pivots 1124, and therefore solely measure an input force imparted by a user to a surface of the button 1110. The measurements of the Hall effect sensor may be output to a processor of the electronic device such that a determination of the input force may be generated. More discussion of the processor of a host electronic device is provided below with respect to FIG. 12.

Figure 11B:
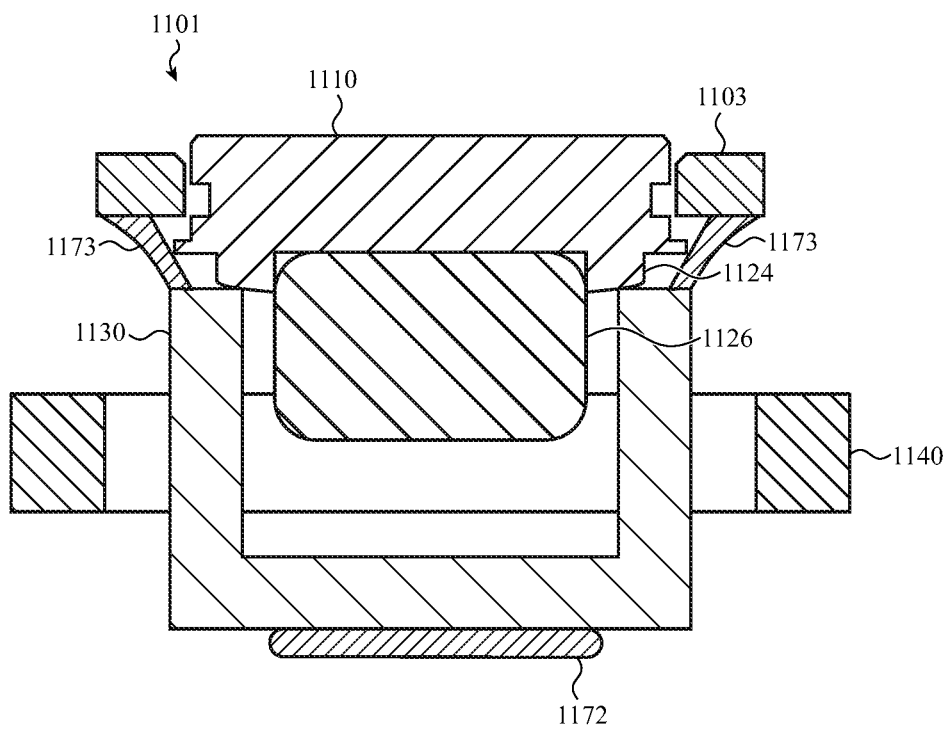
FIG. 11B is a sample side view of another embodiment of a pivoting input device.

With attention to FIG. 11B, another embodiment of a pivoting input device 1101 is depicted. The pivoting input device 1101 is similar to the embodiment of FIG. 11A except that a set of strain gauges 1172, 1173 are provided. The set of strain gauges 1172, 1173 provide a measurement of force input to the button 1110. The pivoting input device 1101 is positioned to fit with an enclosure 1103 of an electronic device.

A pair of first strain gauges 1173 are positioned between a lower surface of the enclosure 1103 of an electronic device and the body 1130 of the pivoting input device 1101. A second strain gauge 1172 is mounted to a lower surface of the body 1130. Other locations for the set of strain gauges 1172, 1173 are possible, such as between a lower surface of the pair of pivots 1124 and an upper surface of the body 1130 receiving the pair of pivots 1124.

Generally, a strain gauge measures a change in electrical resistance in response to a deformation. The resistance change may be correlated to the stress or force that caused the deformation or induced strain in the strain gauge. A common strain gauge includes a set of conductive wires arranged in a long, thin strip.

In some embodiments, the first and second strain gauges 1172, 1173 measure different components of a force, or forces exerted along different axes. Thus, the first strain gauge 1172 may measure forces along a first axis while the second strain gauge 1173 measures forces exerted along a second axis perpendicular to the first axis. The measurements of the strain gauges 1172, 1173 may be output to a processor of the electronic device such that a determination of the input force may be generated.

Figure 11C:
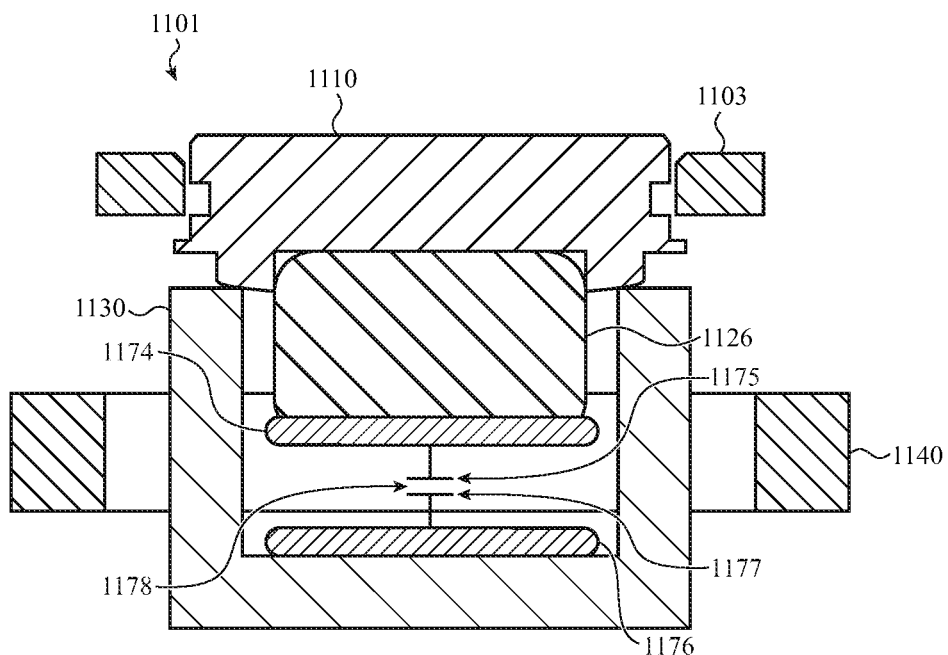
FIG. 11C is a sample side view of another embodiment of a pivoting input device.

With attention to FIG. 11C, another embodiment of a pivoting input device 1101 is depicted. The pivoting input device 1101 is similar to the embodiment of FIG. 11A except that a capacitive gap sensor is provided. The capacitive gap sensor provides a measurement of force input to the button 1110.

The capacitive gap sensor includes a first capacitive plate 1175 coupled to a first body 1174, a second capacitive plate 1177 coupled to a second body 1176, and a gap 1178 between the first capacitive plate 1175 and the second capacitive plate 1177.

Generally, a capacitive gap sensor measures a change in capacitance between two parallel electrically charged plates. The capacitance changes with distance between the plates. The change in capacitance may be correlated to the change in force that caused the change in distance between the plates. The gap may be an air gap or may be fitted with a material, such as a compressible material and/or a dielectric material.

With a force input to a surface of the button 1110, the gap 1178 between the first capacitive plate 1175 and the second capacitive plate 1177 will be reduced, causing a change in capacitance. The change in capacitance may be output to a processor of the electronic device such that a determination of the input force may be generated.

Figure 11D:
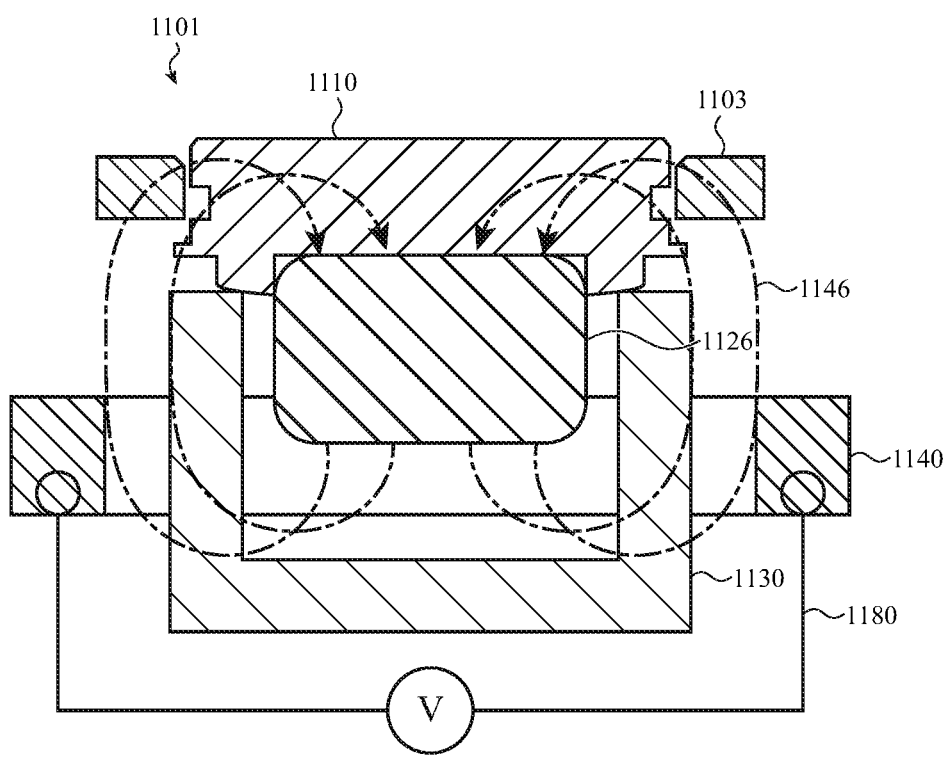
FIG. 11D is a sample side view of another embodiment of a pivoting input device.

With attention to FIG. 11D, another embodiment of a pivoting input device 1101 is depicted. The pivoting input device 1101 is similar to the embodiment of FIG. 11A except that an induction loop formed by components of the pivoting input device 1101 is used to provide a measurement of force input to the button 1110.

A vertical movement of the permanent magnet 1126 will cause a change to the magnetic field 1146 generated by the electromagnet 1140. If the magnetic field 1146 is kept constant, a change to the voltage of the electromagnet 1140 will occur. The change in voltage 1180 may be correlated to the vertical movement of the permanent magnet 1126, which in turn may be correlated to a force input to a surface of the button 1110. The change in voltage may be output to a processor of the electronic device such that a determination of the input force may be generated.

In one embodiment, the permanent magnet 1126 may comprise a first magnet and a second magnet. The first magnet may be used to rotate an attached button 1110 as described in prior embodiments. The second magnet may be used in the induction force sensor as described above. More specifically, movement of the second magnet, caused by a user input to an input surface of the button 1110, is measured by a voltage 1180 change of the electromagnet 1140, which is calibrated to a magnitude of force input.

Figure 11E:
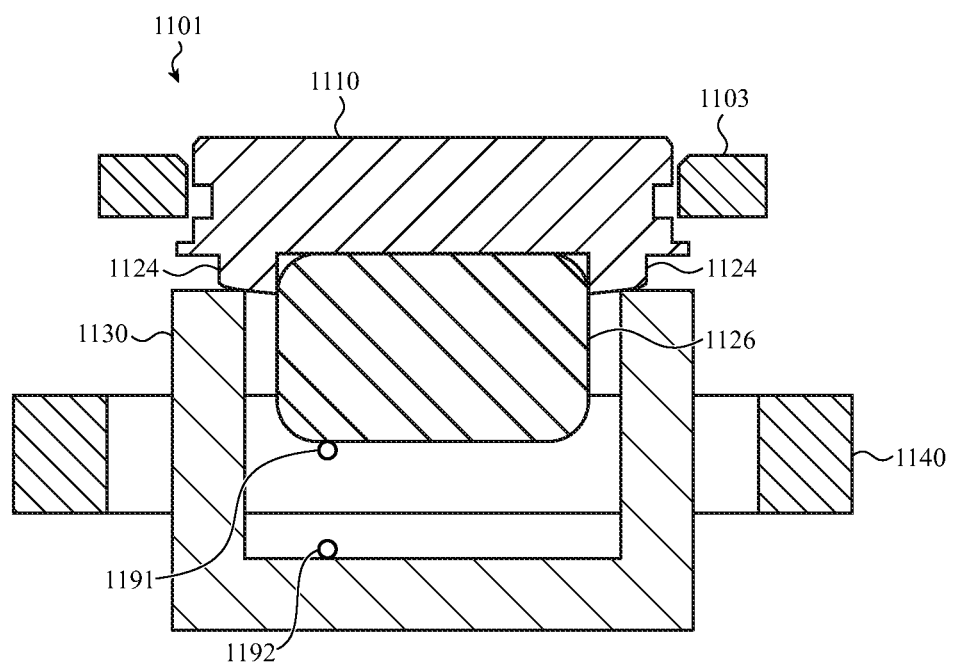
FIG. 11E is a sample side view of another embodiment of a pivoting input device.

With attention to FIG. 11E, another embodiment of a pivoting input device 1101 is depicted. The pivoting input device 1101 is similar to the embodiment of FIG. 11A except that a pair of optical sensors 1191, 1192 are provided. The pair of optical sensors 1191, 1192 provide a measurement of force input to the button 1110.

Generally, an optical sensor measures distance by measuring time of receipt of a transmitted signal. The time is reduced with reduced distance. A reduced distance may in turn be correlated to a force required to reduce the distance, and thus provide a measure of force.

A first optical sensor 1191 is positioned on a lower surface of the permanent magnet 1126. A second optical sensor 1192 is positioned on an inside upper surface of the body 1130. The first optical sensor 1191 may be aligned vertically with the second optical sensor 1192 such that the first optical sensor 1191 cooperates with the second optical sensor 1192. For example, the first optical sensor 1191 may broadcast an optical signal sensed by the second optical sensor 1192, and vice versa. The measures of changed distance provided by the first optical sensor 1191 and/or the second optical sensor 1192 are correlated to a force required to change the measured distance, thereby providing a measure of force input to an input surface of the button 1110. The measurements of the first optical sensor 1191 and/or the second optical sensor 1192 may be output to a processor of the electronic device such that a determination of the input force may be generated.

Other configurations of optical sensors are possible. For example, the first optical sensor 1191 may be replaced with a reflective surface which receives and reflects an optical emission from the second optical sensor 1192. The reflective surface, disposed on the permanent magnet 1126, will move vertically with vertical movement of the button 1110. The second optical sensor 1192 will detect the vertical movement of the reflective surface, and thus vertical movement of the permanent magnet 1126 and the button 1110, by detecting a reduced travel time of an optical emission.

As mentioned above, the force sensor may be any of several types known in the art, to include those described above with respect to FIGS. 11A-11E. Other force sensor types may include piezoelectric force sensors, linear variable differential transducers, load cells such as pneumatic load cells and hydraulic load cells, etc.

The force sensor may be used for purposes other than or in addition to force measurement. For example, the force sensor may be used to prepare the pivoting input device to move or otherwise operate the electromagnetically-sensitive button by, for example, turning on the electromagnet upon receipt of a threshold level of force by the button. In another example, the force sensor may be used to activate an alternate notification, such as an audio notification, to the user upon receipt of a threshold level of force by the button.

In one embodiment, the kinematics of the button movement are influenced or coupled to the level of force measured by the force sensor. For example, a first level of force received may result in a button rotation of a first rotation speed, whereas a higher second level of force received may result in a button rotation of a second higher rotation speed.

FIG. 12 illustrates an example pivoting input device 1200 according to various embodiments. The pivoting input device 1200 includes an input structure 1202 (such as a button), a sensor 1203, a processor 1204, an actuator 1206 such as an electromagnet, and optionally a permanent magnet 1208. A user applies an input to the input structure 1202. The presence of the user input is identified by the sensor 1203 which in turn sends a signal to the processor 1204.

The processor 1204 determines the appropriate response for the identified input. For example, for a pivoting input device 1200 similar to the embodiment of FIGS. 5A-5C, the processor 1204 may determine if the input force exceeds a selectable threshold value. If the threshold value is exceeded, the processor 1204 instructs the actuator 1206 to rotate the input structure 1202. If the actuator 1206 is an electromagnet, it may generate a magnetic field, the magnetic field in turn moving the permanent magnet 1208 and thus moving the input structure 1202 from a neutral position to an actuated position or otherwise providing a haptic and/or visual output to a user, such as a vibration of the input structure 1202. If, however, the input force does not exceed the threshold value, the actuator 1206 does not generate any magnetic field and the input structure 1202 remains in its unactuated position. In some embodiments, no threshold force value is considered, and any non-zero input force would trigger actuation of the input device. Note that a threshold value operation may avoid accidental or nuisance activation of the input device. This is an example of an open-loop system.

Embodiments alternatively may operate as closed-loop systems. For example, a sensor may monitor a pivot angle, degree of rotation, exerted force, or the like of the input device 1200 while haptic output is provided. These sensed parameters may be used as feedback for the actuator in order to adjust operation of the input device 1200. As one example, more or less power may be provided to the actuator 1206 in order to adjust rotation of the input structure.

Some embodiments described herein may rotate or oscillate sufficiently quickly not only to provide a haptic output but also to provide audio output. The input structure's 1202 rotation (or other motion) may occur at frequencies that enable audible sound, typically from 20 Hertz to 20,000 Hertz. Input waveforms to the actuator 1206 may be shaped to provide both haptic output and audio output substantially simultaneously. For example, the actuator 1206 may rotate the input structure 1202 at haptic frequencies for a brief time and then at audio frequencies for a brief time. So long as each haptic output is sufficiently close in time to the next, a continuous haptic sensation may be felt. Likewise, so long as each audio output is sufficiently close in time to the next, a user may perceive continuous audio even if the input device 1200 switches to a haptic output in between audio outputs.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An input device for use with an electronic device, comprising:
    a button defining an input surface;
    a force sensor configured to sense an input force applied to the input surface along an input direction oriented perpendicular to the input surface;
    a permanent magnet attached to the button;
    a body;
    a pivot coupling the body to the button, the pivot having a pivot axis, the input direction intersecting the pivot axis; and an electromagnet adjacent the permanent magnet; wherein the electromagnet is configured to generate a magnetic field in response to the force sensor sensing the input force, thereby rotating the permanent magnet and the button about the pivot axis to provide haptic feedback to the button.

2. The input device of claim 1, further comprising:

the button extends through an enclosure of the electronic device;

the body is affixed to the electronic device;

the body, permanent magnet, and electromagnet are within the enclosure;

the electromagnet defines an interior volume;

the permanent magnet is at least partially within the interior volume;

the electromagnet encircles the body; and the electromagnet is stationary relative to the body.

3. The input device of claim 1, wherein:

the button and permanent magnet rotate about the pivot axis and within a plane defined by a major axis and a minor axis of the input device; and the pivot axis is parallel to the input surface.

4. The input device of claim 1, wherein the permanent magnet is positioned within a space defined the body.

5. The input device of claim 1, wherein the button and permanent magnet are configured to oscillate to provide the haptic feedback.

6. The input device of claim 5, wherein:

the pivot comprises a pair of pins; and the pair of pins rotate with the permanent magnet.

7. The input device of claim 1, wherein an end of the permanent magnet is positioned within an interior volume defined by the electromagnet.

8. The input device of claim 1, wherein:

the electronic device is a mobile device comprising a display;

the button is oblong and extends through a sidewall of the electronic device; and information on the display is modified in response to the input force.

9. An electronic device, comprising:

an enclosure defining an opening;

a body attached to the enclosure;

a button extending through the opening and defining an input surface, the button pivotally attached to the body through a pivot axis;

a sensor configured to detect an input force applied to the input surface along an input direction intersecting the pivot axis;

a permanent magnet attached to the button and positioned within the enclosure; and an electromagnet attached to the body, positioned within the enclosure, and encircling the permanent magnet; wherein motion of the button is configured to provide haptic feedback at the input surface.

10. The electronic device of claim 9, wherein the electromagnet encircles the body.

11. The electronic device of claim 9, wherein:

the electromagnet is positioned within the body; and the permanent magnet is positioned within the body.

12. The electronic device of claim 9, further comprising a processor disposed in the enclosure; wherein:

the sensor is configured to generate a signal in response to an input on the input surface;

the processor is configured to receive the signal from the sensor; and the processor is further configured to activate the electromagnet in response to receiving the signal from the sensor, thereby moving the button with respect to the body to provide haptic feedback.

13. The electronic device of claim 12, wherein:

the sensor is a force sensor; and the button moves if the input exceeds a threshold.

14. An input device, comprising:

an input structure defining an input surface;

a sensor configured to detect a force applied in a direction oriented into the input surface;

a pivot below the input surface and about which the input structure rotates; and an actuator configured to rotate the input structure about the pivot to provide haptic feedback at the input structure in response to the sensor detecting the force; wherein:

rotation of the input structure moves the input surface in a direction substantially transverse to a direction of the force.

15. The input device of claim 14, wherein a major vector of the input surface's movement is tangential to an object applying the force.

16. The input device of claim 14, wherein the input surface is curved.

17. The input device of claim 14, wherein the pivot passes through the input structure and is contained within the actuator.

18. The input device of claim 14, wherein the pivot limits motion of the input structure to rotation about the pivot.

19. An input device, comprising:

an input structure defining an input surface;

a sensor configured to detect a force applied in a direction oriented into the input surface;

a pivot below the input surface and about which the input structure rotates; and an actuator configured to rotate the input structure about the pivot in response to the sensor detecting the force; wherein:

rotation of the input structure moves the input surface in a direction substantially transverse to a direction of the force; and wherein:

the sensor is a first sensor;

the actuator is an electromagnet;

the input device further comprises a second sensor configured to detect a back electromotive force of the electromagnet; and the electromagnet is configured to receive additional power if the back electromotive force exceeds a threshold.

20. The input device of claim 19, wherein the sensor is a Hall effect sensor.

* * * * *